(12) United States Patent
Jerding et al.

(10) Patent No.: US 7,010,801 B1
(45) Date of Patent: Mar. 7, 2006

(54) VIDEO ON DEMAND SYSTEM WITH PARAMETER-CONTROLLED BANDWIDTH DEALLOCATION

(75) Inventors: Dean F. Jerding, Roswell, GA (US); Robert O. Banker, Cumming, GA (US); Sashi Goel, Duluth, GA (US); Arturo A. Rodriguez, Norcross, GA (US); Timothy H. Addington, Roswell, GA (US); Valerie Grew Gutknecht, Duluth, GA (US); Bindu Crandall, Norcross, GA (US); Robert T. Van Orden, Norcross, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 1135 days.

(21) Appl. No.: 09/590,520

(22) Filed: Jun. 9, 2000

Related U.S. Application Data

(60) Provisional application No. 60/138,756, filed on Jun. 11, 1999.

(51) Int. Cl.
*H04N 7/173* (2006.01)
(52) U.S. Cl. .......................... 725/95; 725/8; 725/126; 725/39
(58) Field of Classification Search ............ 725/87–97, 725/39, 1, 8; H04N 7/173
See application file for complete search history.

(56) References Cited

U.S. PATENT DOCUMENTS

| | | |
|---|---|---|
| 4,706,121 A | 11/1987 | Young |
| 4,751,578 A | 6/1988 | Reiter et al. |
| 4,885,775 A | 12/1989 | Lucas |
| 4,908,713 A | 3/1990 | Levine |
| 4,963,994 A | 10/1990 | Levine |
| 4,991,011 A | 2/1991 | Johnson et al. |
| 5,038,211 A | 8/1991 | Hallenbeck |
| 5,253,066 A | 10/1993 | Vogel |
| 5,293,357 A | 3/1994 | Hallenbeck |
| 5,477,262 A | 12/1995 | Banker et al. |
| 5,479,268 A | 12/1995 | Young et al. |
| 5,508,815 A | 4/1996 | Levine |
| 5,568,272 A | 10/1996 | Levine |
| 5,677,905 A * | 10/1997 | Bigham et al. ........ 370/395.21 |
| 5,745,837 A | 4/1998 | Fuhrmann |
| 5,751,282 A | 5/1998 | Girard et al. |
| 5,771,435 A | 6/1998 | Brown |
| 5,809,204 A | 9/1998 | Young et al. |
| 5,905,522 A | 5/1999 | Lawler .......................... 348/7 |
| 5,915,068 A | 6/1999 | Levine |

(Continued)

FOREIGN PATENT DOCUMENTS

EP    0 763 936 A2    3/1997

(Continued)

*Primary Examiner*—Vivek Srivastava

(57) ABSTRACT

The present invention provides a method for an interactive media services system to provide media to a user through an interactive media services client device. The client device is coupled to a programmable media services server device. The method includes the step of implementing an interactive media guide. Additionally, the client device is implemented to present the interactive media guide to the user. A system operator is provided an interface to the programmable media services server. Control options are provided within the interface to allow the system operator to configure a plurality of rental options available to the user. Finally the interactive media service system is implemented such that the plurality of rental options can be executed by the user in a requested active media session.

6 Claims, 34 Drawing Sheets

U.S. PATENT DOCUMENTS 6,253,375 B1 * 6/2001 Gordon et al. ................. 725/88
6,305,020 B1 * 10/2001 Hoarty et al. ................. 725/95
6,484,318 B1 * 11/2002 Shioda et al. ................ 725/110
6,594,826 B1 * 7/2003 Rao et al. ..................... 725/95

FOREIGN PATENT DOCUMENTS

| | | |
|---|---|---|
| EP | 0 891 084 A2 | 1/1999 |
| WO | WO 98/39893 | 9/1998 |

* cited by examiner

253

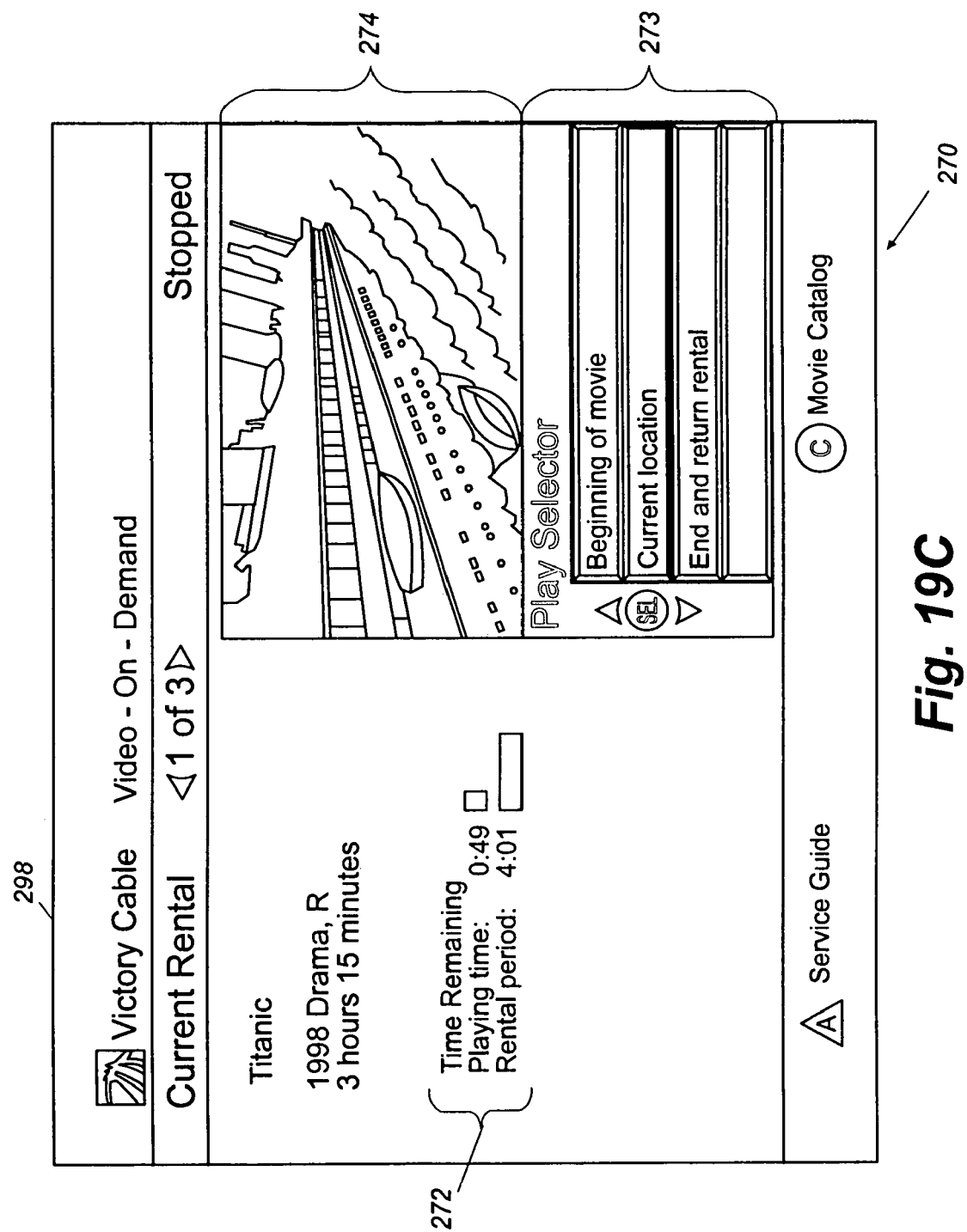

FUNCTIONAL SET UP SCREEN

- PAUSE INVOKES STOP MODE AFTER _____ MINUTES (5-30) (5 IS THE DEFAULT)

- TEAR DOWN SESSION UPON STOP AFTER _____ MINUTES (5-30) (10 IS THE DEFAULT)

- NOTIFY USER _____ MINUTES BEFORE SESSION TEAR DOWN (5 IS THE DEFAULT)

- USER CAN CANCEL BEFORE _____ MINUTES INTO RENTAL OF VOD TITLE (0-15) (1 IS THE DEFAULT)

- USER CAN PREVIEW VOD TITLE _____ MINUTES (1-5) (5 IS THE DEFAULT)

- INITIAL VIEW: ☒ FEATURED TITLES
  ☐ ALL TITLES
  ☐ COMEDY
  ⋮
  (LIST OF ALL OTHER BROWSE-BY CATEGORIES)

VIDEO ON DEMAND SYSTEM WITH PARAMETER-CONTROLLED BANDWIDTH DEALLOCATION

CROSS-REFERENCE TO RELATED APPLICATION

This application claims priority to copending U.S. Provisional Application having Ser. No. 60/138,756 filed Jun. 11, 1999, which is hereby incorporated by reference herein in its entirety.

FIELD OF THE INVENTION

This invention relates in general to television systems, and more particularly, to the field of media-on-demand.

BACKGROUND OF THE INVENTION

Historically, television services have been comprised of analog broadcast audio and video signals. Cable television systems now receive broadcasts and retransmit them with other programming to users over land-line networks, typically comprising fiber optic cable and/or coaxial cable. With the recent advent of digital transmission technology, cable television systems are now capable of providing much more than the traditional analog broadcast video. In addition, two-way and advanced one-way communications between a subscriber and a cable system headend are now possible.

In implementing enhanced programming, the home communication terminal ("HCT"), otherwise known as the set-top box, has become an important computing device for accessing video services and navigating a subscriber through a maze of services available. In addition to supporting traditional analog broadcast video functionality, digital HCTs (or "DHCTs") now also support an increasing number of two-way digital services such as video-on-demand.

Each HCT or DHCT (collectively hereinafter "DHCT") is typically connected to a cable or satellite television network. The DHCTs generally include hardware and software necessary to provide the functionality of the digital television system at the client's site. Preferably, some of the software executed by a DHCT is downloaded and/or updated via the cable television network. Each DHCT typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

To best utilize network bandwidth and provide video-on-demand functionality to the largest number of users, video-on-demand services must offer different options for rental of video-on-demand titles. Providing rental options to a user that according to different levels of functionality and different lengths of time present complex problems in user-interface and bandwidth management.

Additional problems exist in providing the flexibility for users to control the video-on-demand title presentation using VCR-like functions (i.e., rewind, pause, stop, fast-forward, etc.). For example, due to excessive use of the VCR-like functions the user may not have time to watch a particular title in its entirety during the allotted rental period. Thus, there is a need for efficiently handling how the user may operate video manipulation functions and still view the movie in its entirety before the rental duration expires.

If a user is enabled to use such functions as "pause" or "stop"-functions that may cause a still image to be displayed on the display device-a problem exists with images being burned into the display devices left unattended for substantial amounts of time. Thus, there is a need for efficiently handling situations when the user may cause a still image to appear on the display without damaging the display device.

Another problem arises when a user receives a video-on-demand title but either stops, pauses, or otherwise prematurely interrupts or terminates presentation of the title. The problem pertains to the previously allocated bandwidth within the cable or satellite television system and the fact that it may be reserved for the user even during the time the user is not actually viewing the rented title. In order to free resources for more users attempting to view rented titles at the same time, a need exists for efficiently managing allocated network bandwidth and handling user inactivity.

A problem also exists in providing rental options to a user according to different levels of functionality and different lengths of time. Historically hardware resources have provided little flexibility in enabling the cable provider to offer a variety of options for renting movies on demand.

SUMMARY OF THE INVENTION

The present invention provides a method for an interactive media services system to provide media to a user through an interactive media services client device, wherein the client device is coupled to a programmable media services server device. The steps of the method include implementing an interactive media guide to be presented by the client device to the user. The interactive media service system is provided with information of a plurality of dynamic variables regarding an active session of the media. Finally the interactive media service system is implemented with the ability to configure the client device with a control options suite for the active session of the media.

Another aspect of the present invention provides a method for an interactive media services system to provide media to a user through an interactive media services client device. The client device is coupled to a programmable media services server device. The method includes the step of implementing an interactive media guide. Additionally, the client device is implemented to present the interactive media guide to the user. A system operator is provided an interface to the programmable media services server. Control options are provided within the interface to allow the system operator to configure a plurality of rental options available to the user. Finally the interactive media service system is implemented such that the plurality of rental options can be executed by the user in a requested active media session.

Other objects, features, and advantages of the present invention will become apparent to one with skill in the art upon examination of the following drawings and detailed description.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIGS. 19A–19C are display diagrams of MOD current rental screens as described in FIG. 5.

FIG. 22 is a non-limiting example of a system operator GUI 295 for configuring some of the previously described configurable parameters.

DETAILED DESCRIPTION OF THE PREFERRED EMBODIMENT

Figure 1:
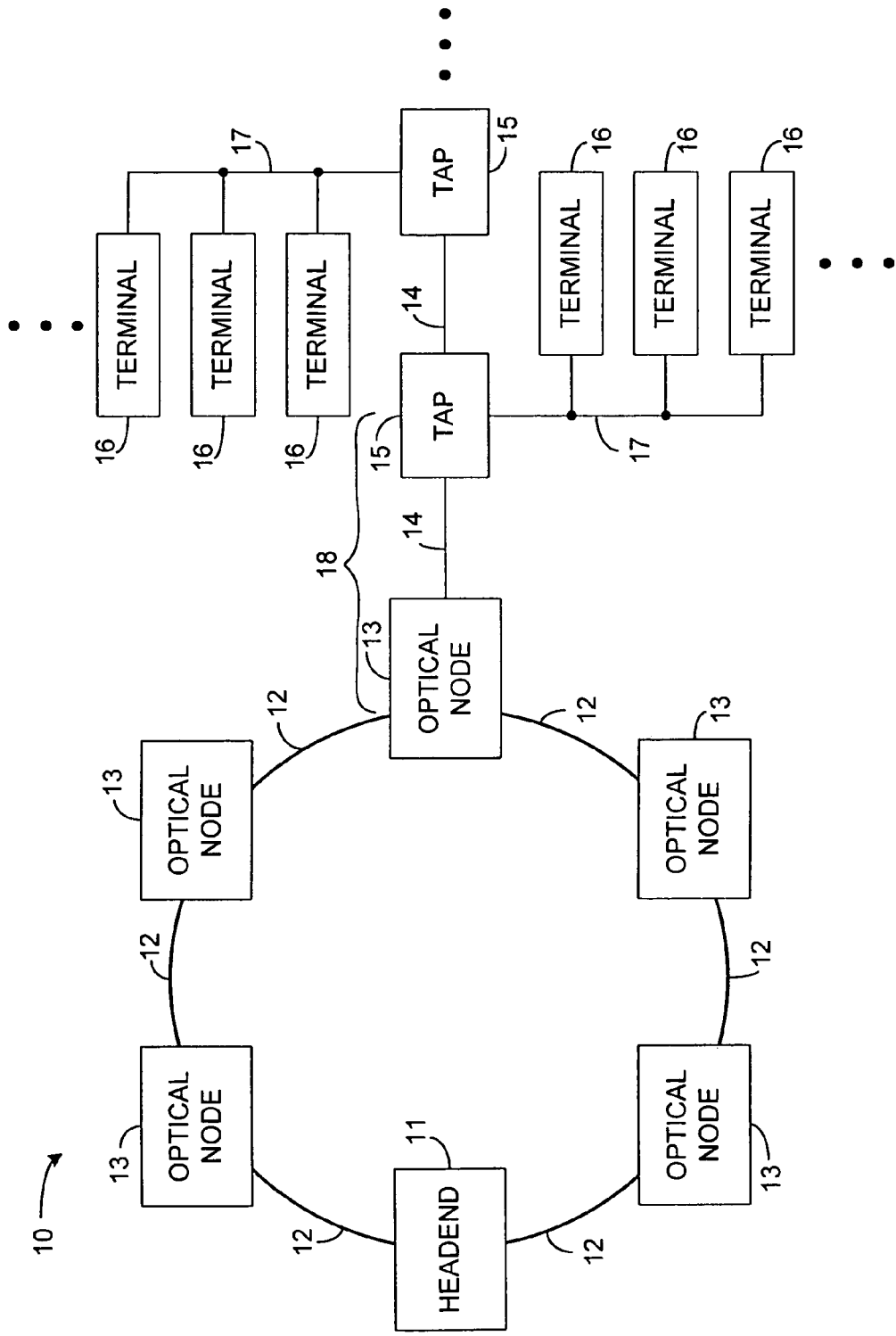
FIG. 1 is a block diagram of a cable television system in accordance with one preferred embodiment of the present invention.

FIG. 1 is a block diagram of a cable television system 10 including a headend 11 for receiving television signals, such as satellite television signals, and converting the signals into a format for transmitting the signals over the system 10. The transmitted signals can, for example, be radio frequency (RF) signals or optical signals, as shown, transmitted over fiber optic cable 12. When the optical signals are transmitted by the headend 11, one or more optical nodes 13 are included in the system 10 for converting the optical signals to RF signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. Thus, headend 11 is connected through a network 18 to multiple DHCTs 16.

Figure 2:
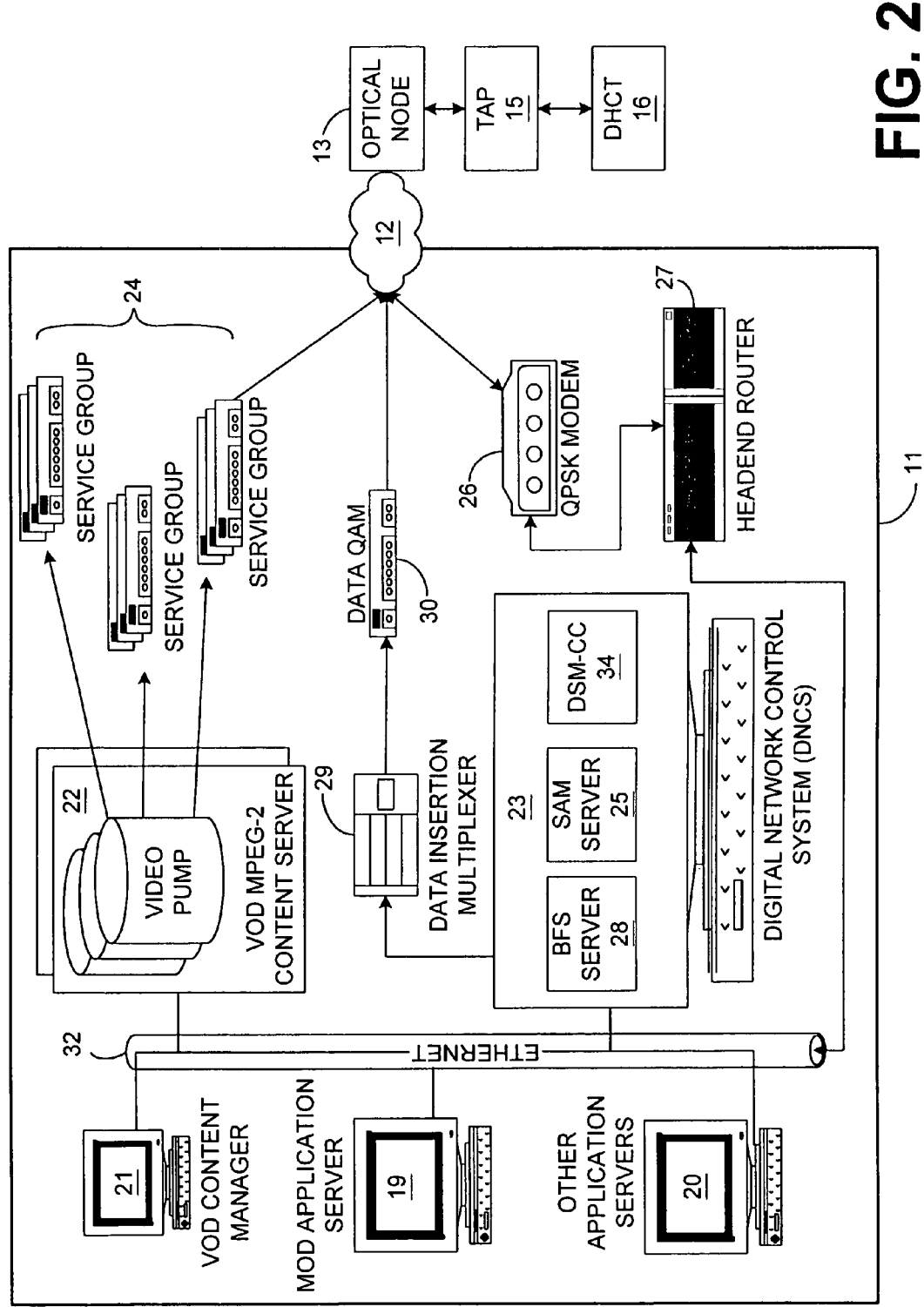
FIG. 2 is a diagram of the headend 11 as depicted in FIG. 1.

FIG. 2 is a block diagram of the headend 11 as configured in the cable television system network to provide media-on-demand (MOD) services. MOD application server 19 is responsible for provisioning the services provided by the MOD application, as directed by the system operator, and for providing the content or data needed by the MOD application client that executes on the DHCT 16. Provisioning is the process that defines the MOD application's services, including the reservation and configuration of system resources needed to provide those services, and the capability to bill for such services. MOD application server 19 and a plurality of other application servers 20 are connected to a digital network control system (DNCS) 23 via an Ethernet connection 32.

The DNCS 23 provides complete management monitoring, and control of the network's elements and broadcast services provided to users. The DNCS 23 uses a data insertion multiplexor 29 and a data QAM 30 to insert the in-band BFS data into an MPEG-2 transport stream. The DNCS 23 also contains a Digital Storage Media-Command-in-Control (DSM-CC) session and resource manager 34 that works with other components of the DNCS 23 in order to support the delivery of the MOD service to the user. The DSM-CC session and resource manager processes user to network (U-N) session signaling messages, manages allocation of session-related network resources and supports network management operations. The DSM-CC session manager 34 (FIG. 2) supports exclusive services such as MOD by providing the signaling interface to establish, maintain and release client initiated exclusive sessions. The DSM-CC session manager 34 acts as a point of contact to the network for the DHCT's in the network 18 to establish individual sessions. The DSM-CC session manager 34 also defines a resource descriptor structure, which is used to request the network resources within a session.

The MOD application server 19 communicates via the Ethernet connection 32 to a service application manager (SAM) server 25 contained on the DNCS 23. The SAM 25 provides a model in which the user can access services available on the system. A service consists of an application to run and a parameter, such as data content, specific to that service. The SAM 25 handles the lifecycle of the applications on the system, including the definition, initiation, activation, suspension and deletion of services they provide and the downloading of the application into the DHCT 16. Many services can be defined using the same application component, with different parameters. The MOD application server 19 defines its application to the SAM server 25 and the SAM server 25 instructs a broadcast file system (BFS)

server 28 to add the MOD application client executable code to the carousel (not shown) for distribution to the various DHCTs 16 in the network 18.

The BFS server 28 is a part of a broadcast file system that has a BFS client 43 (FIG. 3) module in each DHCT 16 in the network 18. Applications on both the headend 11 and the DHCT 16 can access the data stored in the BFS server 28 in a similar manner to a file system found on disc operating systems. The BFS server 28 repeatedly sends data for applications on a carousel (not shown) over a period of time so that the DHCT 16 that is interested in any particular data may receive it when it is the user desires the data. Thus, the BFS client 43 contained in the DHCT 16 that receives the broadcast from the BFS server 28 can implement the application for the user.

The video-on-demand (VOD) content manager 21 and VOD content servers 22 deliver MPEG-2 content to a service group of QAM modulators that comprise service group number 24. The content manager 21 is responsible for managing the content on the VOD content servers 22. The MOD application server 19 utilizes the VOD content manager 21 and VOD content servers 22 to deliver the video and audio streams that make up the MOD services. The MOD application server 19 is also responsible for controlling the VOD content manager 21 and VOD content servers 22. The service group 24 is actually a multiplex of QAMs that illuminate a particular DHCT 16. A network session manager (not shown) in a DNCS 23 uses the service group 24 to determine which QAM modulator has access to a particular DHCT 16. The QAM modulators that comprise the service group 24 receive the MPEG-2 transport stream from the VOD content servers 22 and convert it to an RF signal at a specified frequency (channel). The QAM modulators of the service groups 24 are also responsible for encrypting the transport stream and inserting other data and information into the stream.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various application servers 19, 20.

Figure 3:
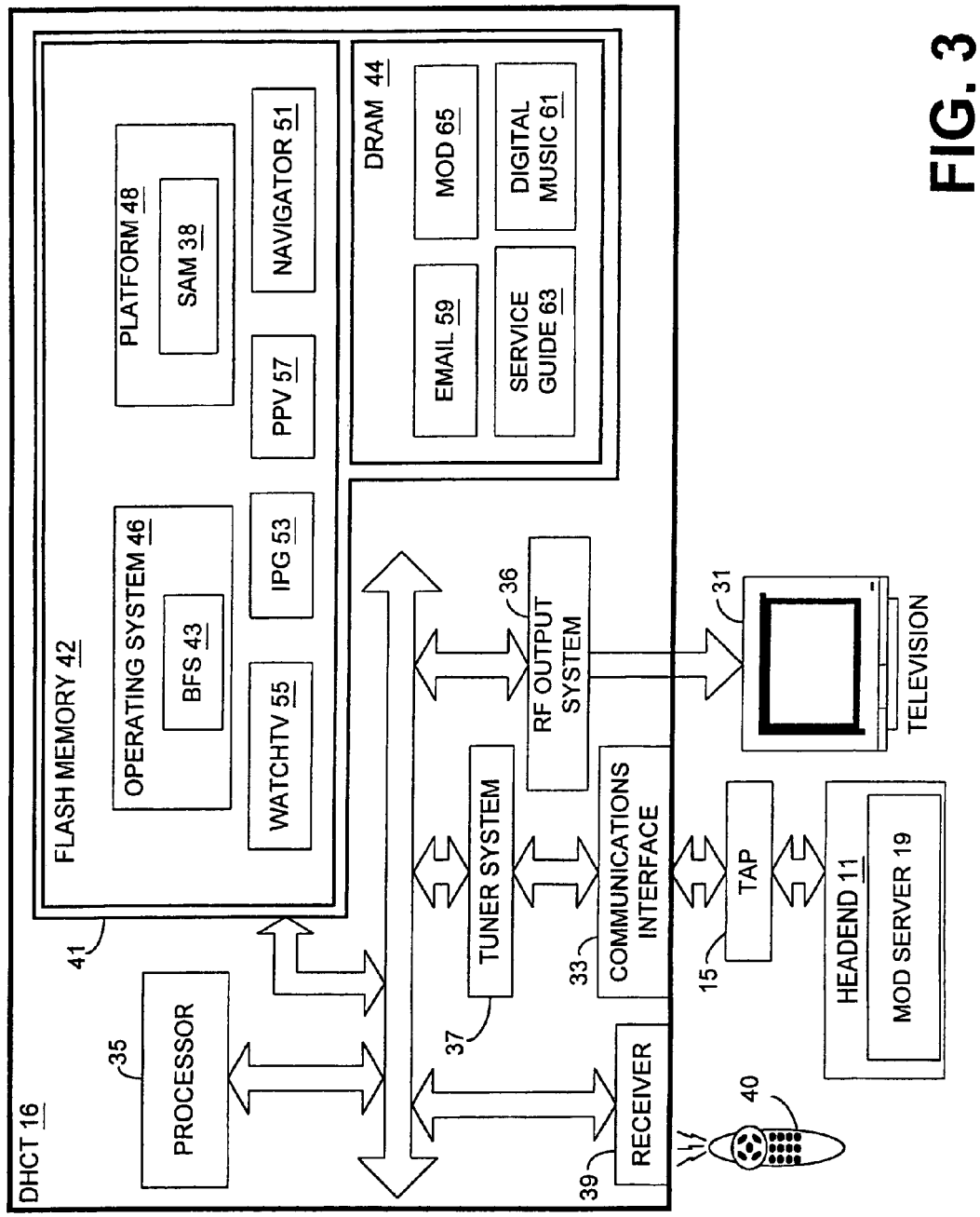
FIG. 3 is a block diagram of a DHCT and related equipment, in accordance with one preferred embodiment of the present invention depicted in FIG. 1.

FIG. 3 is a block diagram illustrating the DHCT 16 coupled to headend 11 discussed above with other system equipment. The DHCT 16 is typically situated within the residence or business of a user. It may be integrated into an output device that has a display 31, such as a television set, or it may be a stand-alone unit that couples to an external display 31, such as a display included with a computer or a television, and that processes media transported in television signals for presentation or playback to a subscriber (user of the DHCT). The display device also includes audio output equipment. In a non-limiting example, the display 31 includes a hi-fi stereo for digital quality music reproduction. The DHCT 16 preferably comprises a communications interface 33 for receiving the RF signals, which can include media such as video, audio, graphical and data information, from the tap 15 and for providing any reverse information to the tap 15 for transmission back to the headend 11 (FIG. 1). The DHCT 16 further includes at least one processor 35 for controlling operations of the DHCT 16, including a video output port such as an RF output system 36 for driving the display 31, a tuner system 37 for tuning into a particular television channel to be displayed and for sending and receiving data corresponding to various types of media from the headend 11. The tuner system 37 includes in one implementation, an out-of-band tuner for bidirectional quadrature phase shift keying (QPSK) data communication and a quadrature amplitude modulation (QAM) tuner for receiving television signals. Additionally, DHCT 16 includes a receiver 39 for receiving externally-generated information, such as user inputs or commands for other devices. The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device 40 (FIG. 7) or keyboard that includes user-actuated buttons.

In one implementation, a memory portion 41 of the DHCT 16 includes flash memory 42 and dynamic random access memory (DRAM) 44 for storing the executable programs and related data components of various applications and modules for execution by the DHCT 16. Both the flash memory 41 and the DRAM memory 44 are coupled to the processor 35 for storing configuration data and operational parameters, such as commands that are recognized by the processor 35.

Basic functionality of the DHCT 16 is provided by an operating system 46 that is contained in flash memory 42. One or more programmed software applications, herein referred to as applications, are executed by utilizing the computing resources in the DHCT 16. The application executable program stored in flash memory 42 or DRAM 44 is executed by processor 35 (e.g., a central processing unit or digital signal processor) under the auspices of the operating system 46. Data input by the application program is stored in DRAM 44 and read by processor 35 from DRAM 44 as need be during the course of application program execution. Input data may be data stored in DRAM 44 by a secondary application or other source, either internal or external to the DHCT 16, or possibly anticipated by the application and thus created with the application program at the time it was generated as a software application program, in which case it is stored in flash memory 42. Data may be received via any of the communication ports of the DHCT 16, from the headend 11 via the DHCT's network interface (i.e., the QAM or out-of-band tuners) or as user input via receiver 39. A type of input data fulfills and serves the purpose of parameters as described below. Data generated by application program is stored in DRAM 44 by processor 35 during the course of application program execution.

The flash memory 42 also contains a platform library 48. The platform library 48 is a collection of functionality useful to applications, such as a Timer Manager, Compression Manager, Database Manager, Widget Toolkit, String Managers, and other utilities (not shown). These utilities are accessed by applications so that each application does not have to contain these utilities thus resulting in memory consumption savings and a consistent user interface.

The SAM, as discussed above, includes a SAM server 25 (FIG. 2) in headend 11 and a SAM client 38 in the DHCT 16. The SAM client 38 is a part of the platform library 48. As a non-limiting example, an application to tune video programming could be executed with one set of parameters to view HBO and a separate set of parameters to view CNN. Each association of the application component (tune video) and one parameter component (HBO or CNN) represent a particular service that has a unique service ID.

An application client is the portion of an application that executes on the DHCT 16 and provides the application's services to the user typically through a graphical user interface. Also contained in flash memory 42 is a navigator application 51 that provides a navigation framework for the user to access services available on the cable system. Examples of the services include, in one implementation, watching television and pay-per-view events, listening to digital music, and an interactive program guide, each of which is controlled through separate applications in flash memory 42. The navigator 51 also allows users to access various settings of the DHCT 16, including volume, parental control, VCR commands, etc.

Interactive program guide (IPG) 53, Watch TV 55, and pay-per-view (PPV) 57 are all resident applications in flash memory 42. The IPG 53 displays a program guide to the user and populates the guide with program data for selection. Watch TV 55 enables a user to simply "watch television" while PPV 57 enables other services to be organized into events and purchased as premium television services. These applications, because they are in flash memory 42, are always available to the user and do not need to be downloaded each time the DHCT 16 initializes.

The applications that are stored in the DRAM 44 may be applications that are loaded when the DHCT 16 initializes or are applications that are downloaded to the DHCT 16 upon a user-initiated command using an input device such as the remote 40. In this non-limiting example, as shown in FIG. 3, DRAM 44 contains the following application clients: an e-mail application client 59, a digital music application client 61, a service guide application 63 and a media-on-demand application client (MOD) 65 (discussed in more detail below). It should be clear that these applications are not limiting and merely serve as examples for this present embodiment of the invention.

The applications shown in FIG. 3 and all others provided by the cable system operator are top level software entities on the network for providing services to the user. In one implementation, all applications executing on the DHCT 16 work with the navigator 51 by abiding by several guidelines. First, an application utilizes and implements the SAM client 38 for provisioning, activation, and suspension of services. Second, an application shares DHCT 16 resources with other applications and abide by the resource management policies of the SAM client 38, the operating system 46, and the DHCT 16. Third, an application handles all situations where resources are unavailable without navigator 51 intervention. Fourth, when an application loses service authorization while providing a service, an application should suspend the service gracefully. The navigator 51 will reactivate an individual service application when it later becomes authorized. Finally, an application is configured so it does not respond to input commands reserved for the navigator 51. For instance, as a non-limiting example, when user input commands are entered via a wireless remote control device or keyboard 40, the application is configured so it does not have access to certain user input keys that are reserved by the navigator 51 (i.e., power, channel +/−, volume +/−, etc.). However, without any limitations to the aforementioned, in certain circumstances certain applications during the course of program execution may reach a machine-state in which input keys that would ordinarily be reserved may be employed for input by the application but mainly during that particular machine-state. For instance, an application may display a user interface that specifically requests input or selection from the user in which one or more of the reserved keys are used momentarily during that machine-state.

The MOD application client 65 (FIG. 3), in providing its service, engages in a direct two-way IP (Internet Protocol) connection with a VOD content server 22 (FIG. 2). The MOD application server 19 is responsible for providing configuration and service data to the MOD application client 65, such as the catalog of titles available for rental by the user.

To provide the MOD service to the user, the MOD application client 65 interacts with the MOD application server 19 (FIG. 2) and other elements in the headend 11 to provide the on-demand service, such as the VOD content server 22. Before describing the MOD application operation itself, some of the system infrastructure used by the MOD application to provide the MOD services will be described. While the network platform to support video-on-demand is not the subject of this invention, the method in which the MOD application utilizes this platform is novel. FIGS. 4A–4M are flow diagrams that define the signaling interactions between the DHCT 16, the DNCS 23, the MOD application server 19, and the VOD content server 22 to set up, maintain, and tear down VOD sessions.

Figure 4A:
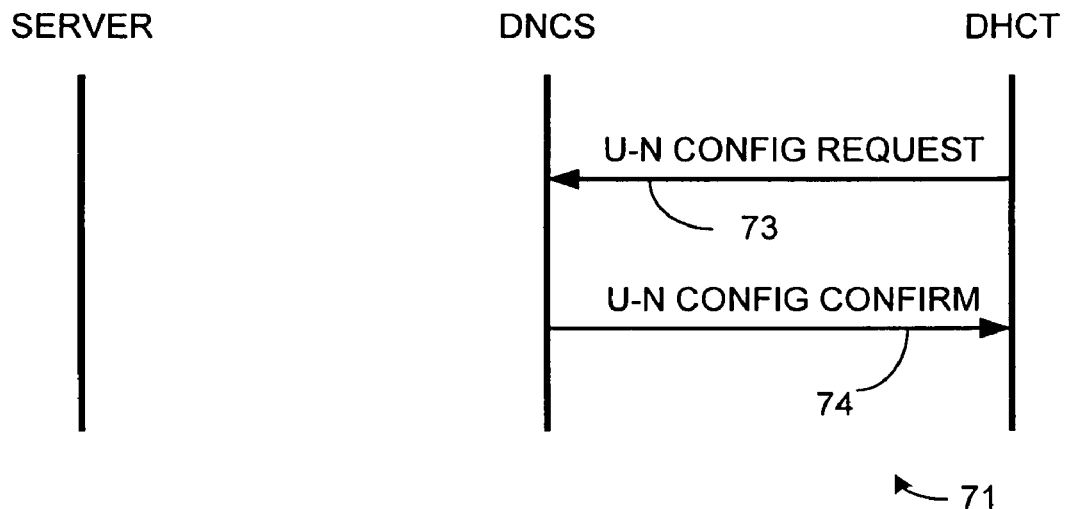
FIGS. 4A–4M are flow diagrams that define the signaling interactions between the DHCT, the DNCS, the MOD application server, and the VOD content server 22 to set up, maintain, and tear down VOD sessions.

The first signal and scenario, as shown in step 71 in FIG. 4A, is the DHCT initialization scenario. The DHCT 16 requests a configuration 73 from the network 18 (FIG. 1), and if the DHCT 16 is verified as an authorized device on the network 18, the DNCS 23 (FIG. 2) sends back a confirmation 74 with the parameters for the DHCT 16 to operate on a network 18. This scenario 71 is performed automatically whenever a DHCT 16 is connected to the network The MOD application client 65 is not responsible for performing initialization; however, the operating system 46 provides an application programming interface (API) which allows an application to query configuration parameters received in the U-N ConfigConfirm message 74.

Figure 4B:
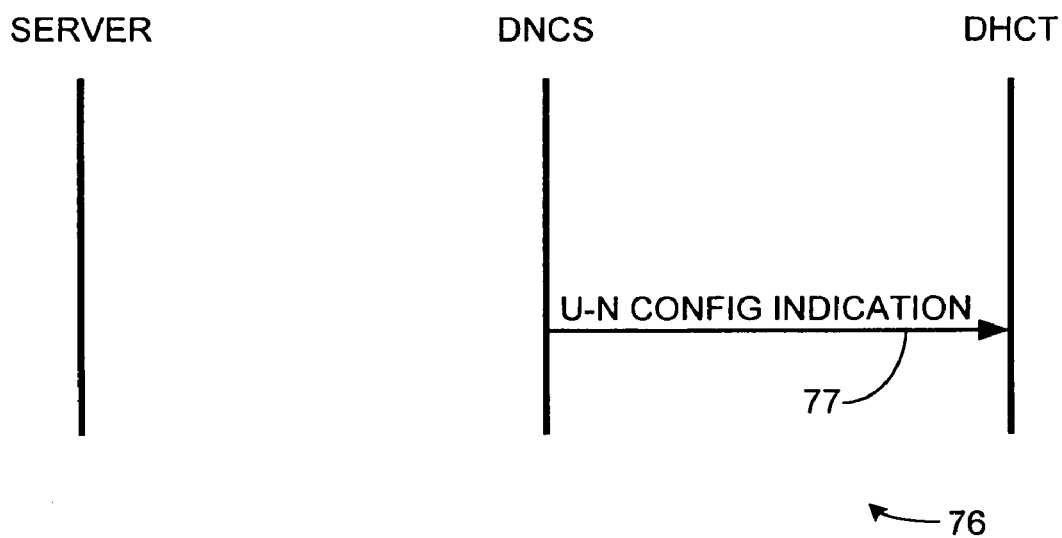
Figure 4C:
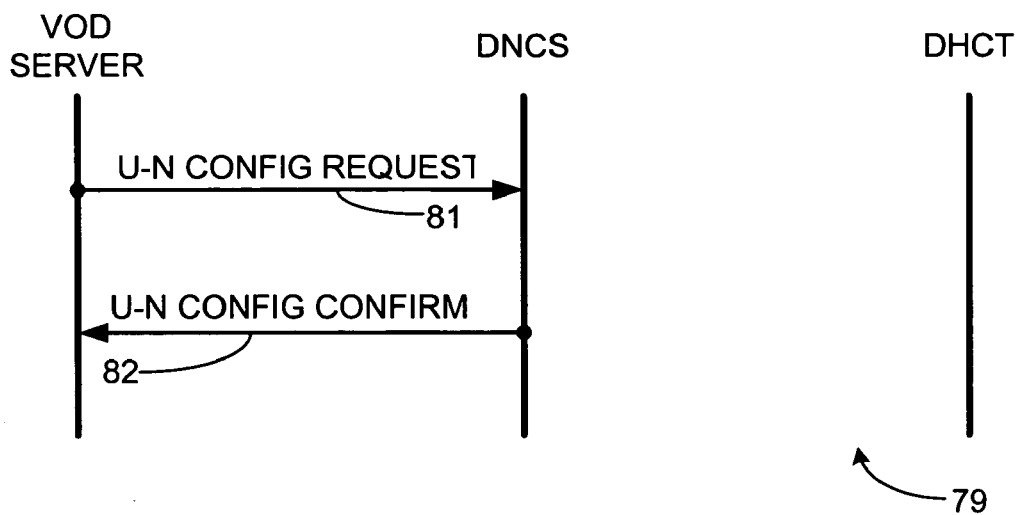

FIG. 4B is a display diagram of the DHCT 16 configuration update scenario 76 periodically performed to update the network configuration of a DHCT 16 after the initial configuration 71 has been completed. This update scenario 76 occurs when the configuration has been changed at the headend 11, and U-N ConfigIndication message 77 may be addressed to a group of DHCTs 16 to update a particular set of network parameters on the entire group. The U-N ConfigIndication message 77 may be sent at any time after a DHCT 16 has been configured on the network 18 and contains the same message as sent in the initialization confirmation 74 but with fewer parameters included.

The MOD application server 19 initialization scenario 79 (FIG. 4C) is used whenever a server is introduced to the network 18. The MOD application server 19 makes a configuration request 81 from the network that is verified by the DNCS 23 with a configuration confirmation message 82, along with parameters for the MOD application server 19 to operate on the network 18.

Figure 4D:
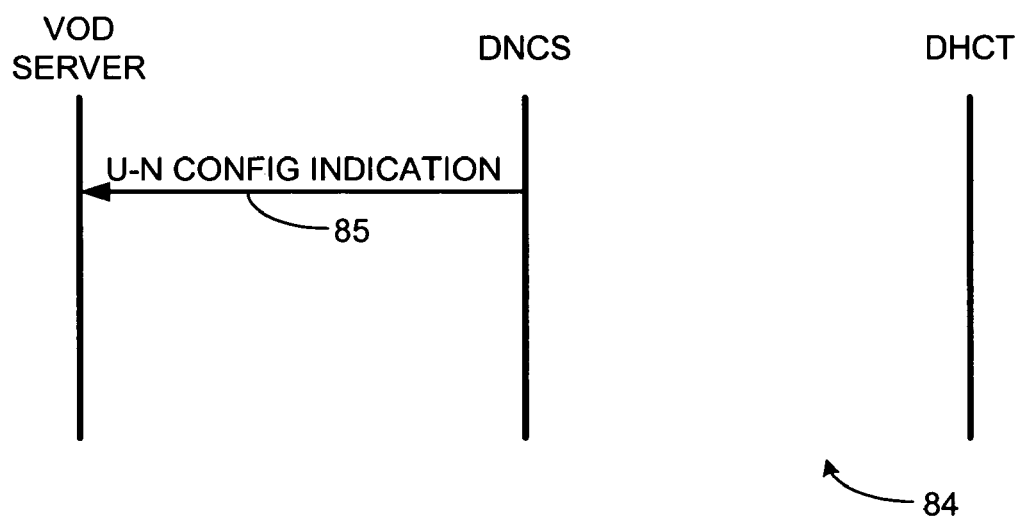

The MOD application server 19 may also receive update messages from the DNCS 23 after the initial configuration 79 has been completed. The DNCS 23 periodically sends the configuration indication message 85, as shown in FIG. 4D, to the MOD application server 19 over an extended period of time. The configuration indication message contains the same message that was sent in the initial configuration 79, with fewer parameters included. Although the MOD application server 19 receives its message repeatedly from the DNCS 23, the MOD application server 19 needs to process the message if the transaction identification changes from previous messages.

Figure 4E:
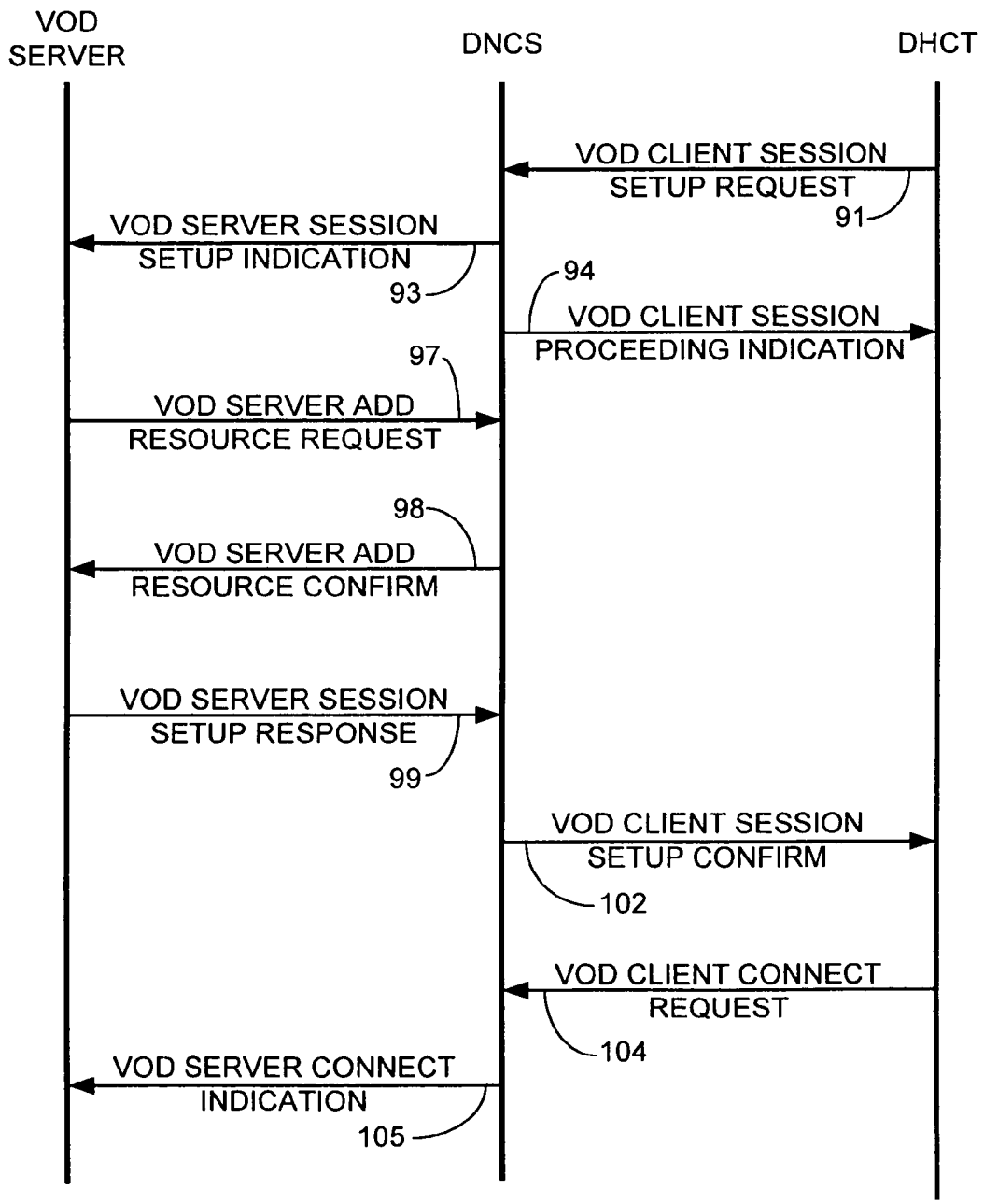

FIG. 4E is a diagram of the steps to establish a MOD session. The DHCT 16 initially sends a message 91 to the DNCS 23 that initializes a session request. The request 91 usually happens after the MOD application client 65 has allowed the user to select a title that the user wishes to rent or purchase. Information about the on-demand media and any other application specific information is passed from the MOD application client 65 to the VOD content server connection manager in the VOD server session setup indication message 93. This setup indication message 93 is not modified by the DNCS 16, but is merely passed straight to the MOD application server 19. When the MOD application server 19 receives the session setup indication message 93, it verifies the eligibility of the DHCT 16 and the service that is being requested. The DNCS 23 may send the DHCT 16 a session proceeding indicating message 94.

If the VOD content server 22 determines that it can deliver the service, it sends a ServerAddResourceRequest message 97 to the DNCS 23 to reserve the network resources to deliver that service. The DNCS 23 allocates the requested resources and sends to the VOD content server 22 a ServerAddResourceConfirm message to indicate that the requested resources have been allocated. The VOD content server 22 then responds to the service session indication message 93 with a server setup response message 99 that indicates that the VOD content server 22 is ready to begin delivering the service using the resources allocated by the DNCS 23. VOD content server 22 session setup response message 99 may contain user data which is passed by the DNCS 23 to the DHCT 16. The DNCS 23 sends the ClientSessionSetupConfirm message 102 to the DHCT 16 that contains the resource descriptors (not shown) needed by the DHCT 16 to receive the requested service. This message 102 may contain the user data that was sent from the VOD content server 22. Finally, the DHCT 16 sends to the DNCS 23 a ClientConnectRequest message 104 indicating that the DHCT 16 is ready to receive the requested service, and the DNCS 23 sends the VOD content server 22 a connect indication message 105 indicating that the DHCT 16 is ready to receive that service.

The resource descriptors described above are used to define the resources which are allocated to a session. An interactive session has two resource "views." VOD content server 22 defines the resources that are used to deliver the service from VOD content server 22 into the network 18. The MOD application client 65 defines resources that are used in order for the DHCT 16 to receive the service from the network 18.

The VOD content server 22 resource descriptor view is used when the server is delivering an MPEG program over a transport stream that is directly connected to the network 18 and does not require any signaling to set up the connection. The video on demand service architecture described above uses this type of connection.

For the MOD application server 19 resource descriptor view, two resource descriptors are used. The TSDownstreamBandwidth resource descriptor contains a transport stream ID field and a bandwidth field. The transport stream ID identifies the physical connection from the MOD application server 19 to the network 18. This transport stream ID is typically assigned by a network operator when a new connection is installed. The downstream bandwidth resource descriptor also identifies, in bits per second, the amount of bandwidth to deliver a service. This amount of bandwidth will be reserved in the network 18 for the duration of the MOD session with the DHCT 16 that requests the service.

The MPEG Program resource descriptor is another VOD content server 22 resource descriptor view. This resource descriptor identifies the MPEG Program that is carrying the service and used by the network to determine which program from the transport stream to route to the DHCT 16. The MPEG program also allows the application to assign association tags to each of the elementary streams in the program. These association tags may be used by the receiver to determine the use of each of the streams. The association tag is guaranteed to be maintained and to end in a session even if the MPEG program is remapped. The second resource view of an interactive session is the MOD application client 65 resource descriptor view. This view is used for all services that use MPEG to deliver the downstream data. The MOD service architecture defined above uses this type of connection for all downstream connections. The resource descriptor, "TSDownstreamBandwidth," contains a transport stream ID field and a bandwidth field. The transport stream ID identifies the QAM modulator in service group 24 (FIG. 2) that is transmitting a service. This transport stream ID is assigned by a network operator (not shown) when a new QAM 24 is installed. The downstream bandwidth resource descriptor identifies, in bits per second, the bandwidth at which a service will be delivered.

MPEG Program resource descriptor identifies the MPEG program that is carrying the service. This resource descriptor is used by the DHCT 16 to determine which program from a transport stream to decode. This descriptor also allows the MOD application client 65 to assign association tags (not shown) to each of the elementary streams in the program. These association tags may be used by the DHCT 16 to determine the use of each of the streams. The association tag is guaranteed to be maintained end-to-end in a session even if an MPEG program resource descriptor has been remapped.

Figure 4F:
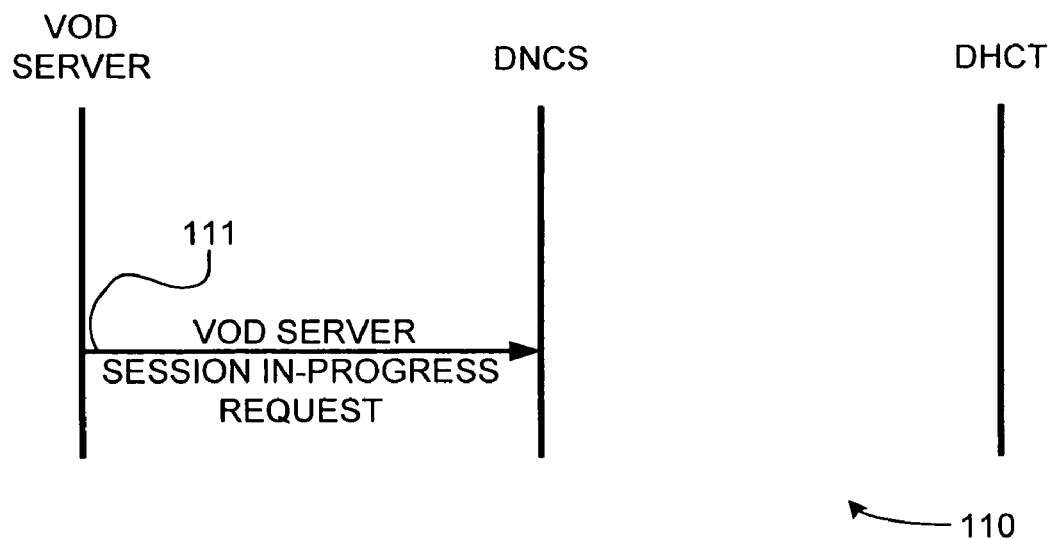

Another signaling scenario supported by the present invention is the VOD content server 22 in-progress scenario. FIG. 4F is a display diagram 110 depicting the MOD application server in progress request message 111 communicated from the VOD content server 22 to the DNCS 23. The DNCS 23 uses this message 111 as an audit mechanism to determine if it is in sync with the VOD content server 22. The MOD application server periodically sends this MOD application server session in progress message 111 to the DNCS 23. The message 111 contains a list of all active sessions for that MOD application server, and the DNCS 23 compares this list to its list of active sessions for that particular application server 23. The DNCS 23 takes appropriate action if the lists do not match.

Figure 4G:
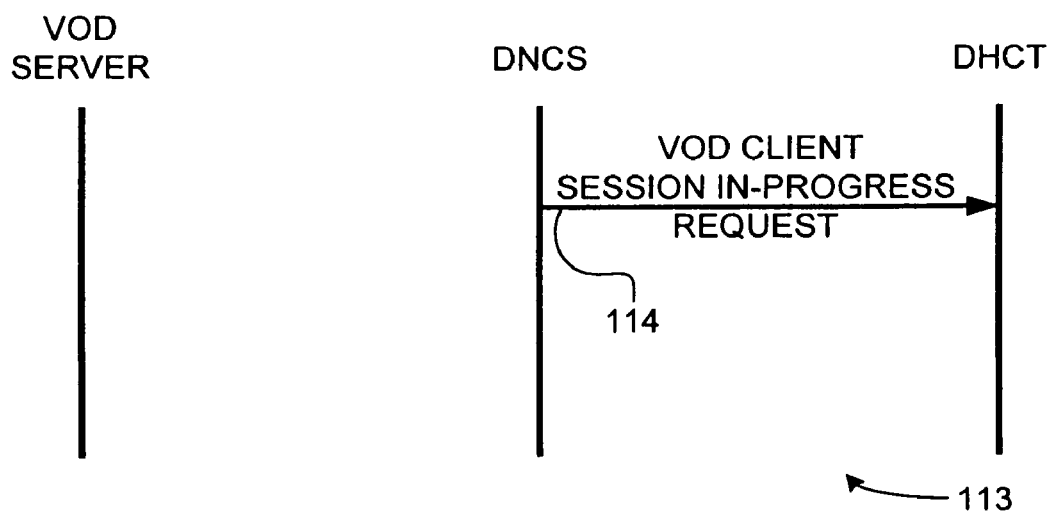

The DNCS 23 periodically initiates a MOD application client session in progress request 114 as shown in scenario 113 in FIG. 4G. This message 114 is used to periodically inform the network 18 of the sessions that are active on a DHCT 16. The DNCS 23 uses this message as an audit mechanism to determine if it is in sync with the DHCT 16. The DHCT 16 periodically sends a client in session progress message (not shown). This message contains a list of all active sessions for the DHCT 16. The DNCS 23 compares this list to a list of active sessions for that DHCT 16 and takes appropriate action if the lists do not match.

Figure 4H:
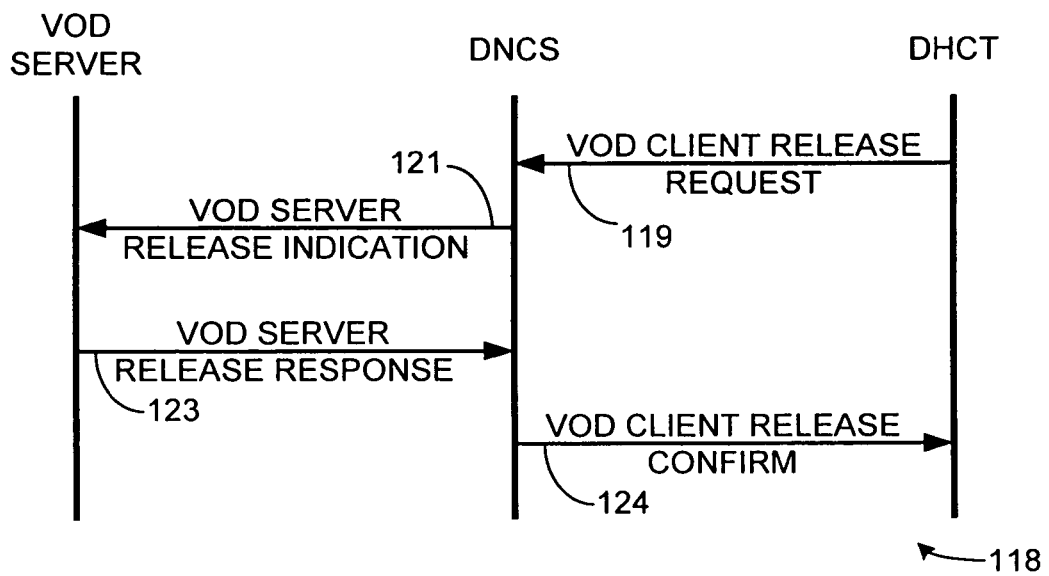

The present invention permits the DHCT 16 to initiate a MOD session tear down scenario. FIG. 4H is a display diagram 118 depicting the procedure for tearing down a session using the client initiated session release scenario. A session that is active on that particular DHCT 16 may be torn down by the DCHT 16. To initiate this process, the DHCT 16 sends a MOD application client release request 119 to the DNCS 23. The DHCT 16 sends the client release request 119 after it has stopped using all resources for a session that it is attempting to tear down. The DNCS 23 receives the client release request 119 and initiates a MOD server release indication 121 to the VOD content server 22. The VOD content server 22 responds with a server release response 123 to the DNCS 23 which is then passed DHCT 16 in the form of a MOD client release confirm message 124. The network 18 does not release the resources provided for the session until the MOD server release response 123 is received from the MOD application server 19.

Figure 4I:
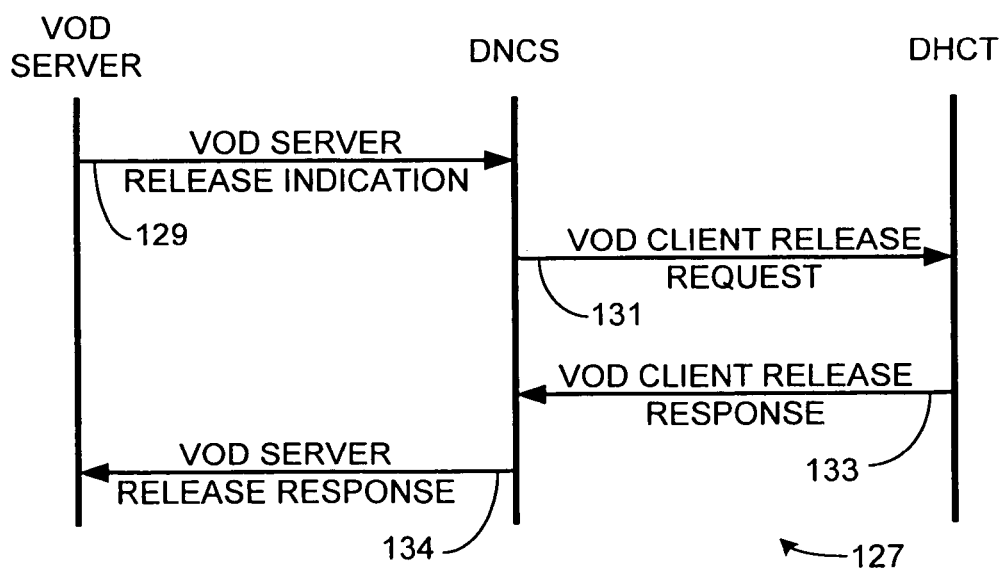

A session tear down scenario may also be initiated by the MOD application server 19. FIG. 4I is a display diagram 127 of the process for a VOD content server 22 to tear down a session. The VOD content server 22 issues a server release request 129 to the DNCS 23 after it has stopped using all resources for a particular session that it is attempting to tear down. The DNCS 23 initiates a client release indication message 131 to the MOD application client 65 on the DHCT 16 which is responded to in the form of a client release response 133. The DNCS 23 then initiates a server release confirm message 134 to the VOD content server 22 that initiated the tear down scenario. The network 18 does not release the resources for the MOD session until the client release response message 133 is received by the DNCS 23.

Figure 4J:
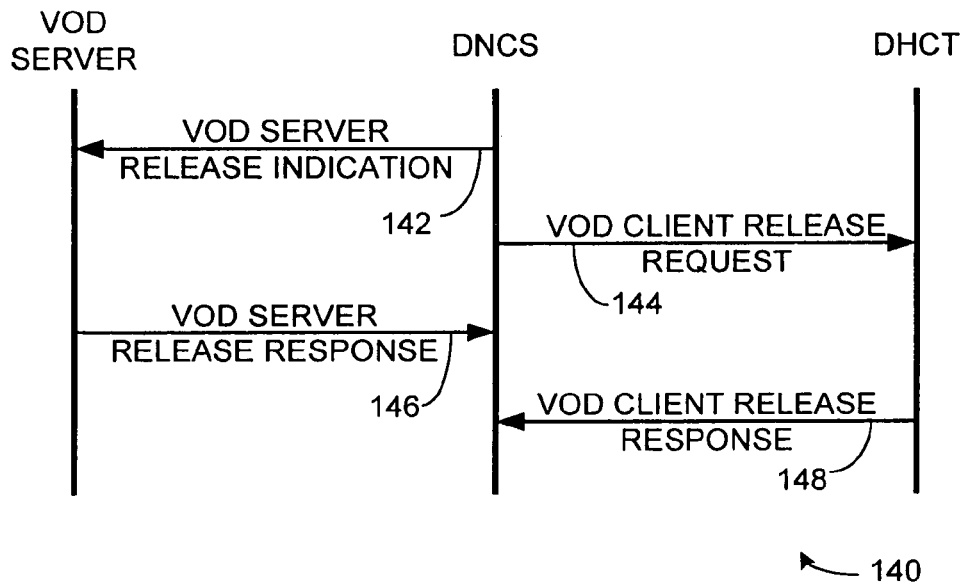

A MOD session tear down scenario may also be initiated by the DNCS 23. FIG. 4J is display diagram 140 of the DNCS 23 initiated session tear down scenario. In so doing, the DNCS 23 initiates a server release indication message 142 to the VOD content server 22 providing the MOD session. The DNCS 23 may also simultaneously release the client release indication message 144 to the DHCT 16 notifying the DHCT 16 of the tear down sequence. The VOD content server 22 that received the server release indication message 142 responds by a server release response message 146, and the DHCT 16 responds to the client release indication message 144 with a client release response message 148. The resources attributed or assigned to the MOD session are not released until both the client release response message 148 and the server release response message 146 are received by the DNCS 23.

Figure 4K:
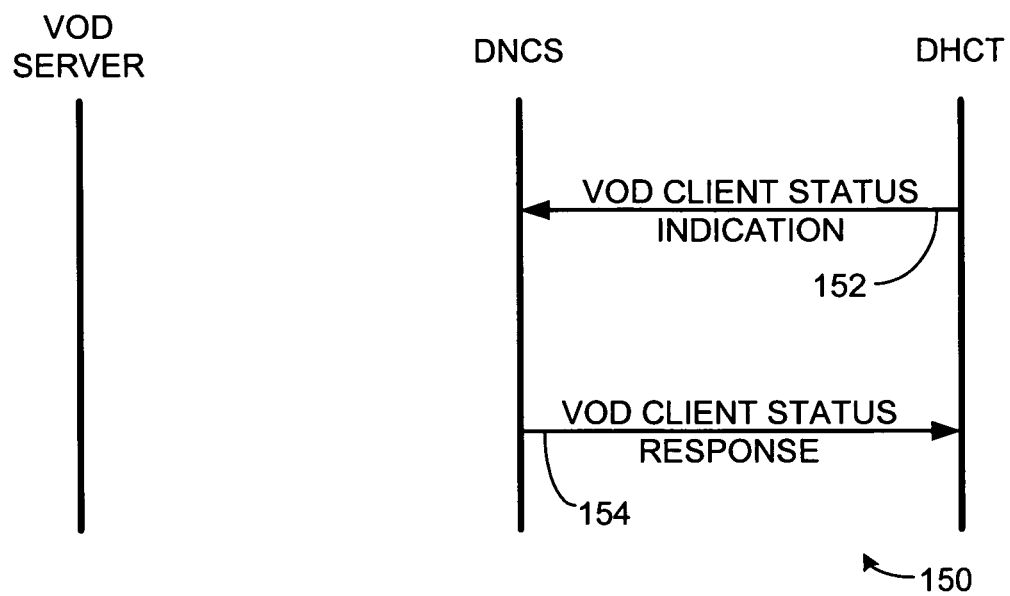

The VOD content server 22 provides an API by which the application servers can register interest in session setup and tear down events. Events describing these events are sent to registered application servers and include the session ID and the user (application) data contained in the session setup request, such as the MAC address of the DHCT 16, the title ID, and the rental option in the case of the MOD application. In this way the MOD application server 19 can be notified when a VOD session is established with the VOD content server 21 by the MOD application client 65. Additionally, the MOD application server 19 may use the API to request that the VOD content server 22 tear down the session if the user of the DHCT 16 is not authorized for the MOD service for billing reasons. The DHCT 16, the VOD content server 22, and the DNCS 23 may each initiate a session status scenario to determine the status of both the network and the other components described above. FIG. 4K is a display diagram 150 of a client initiated session status scenario. This procedure is used by DHCT 16 to query the DNCS 23 for the sessions that the DNCS 23 is maintaining for that DHCT 16. This procedure is also used to obtain detailed information about a session so that the DHCT 16 may re-establish a session after a reboot. The DCHT 16 initiates a client status request message 152 to the DNCS 23 to determine the status of the network 18. The DNCS 23 responds with a client status confirm message 154 reporting the status to the DHCT 16.

Figure 4L:
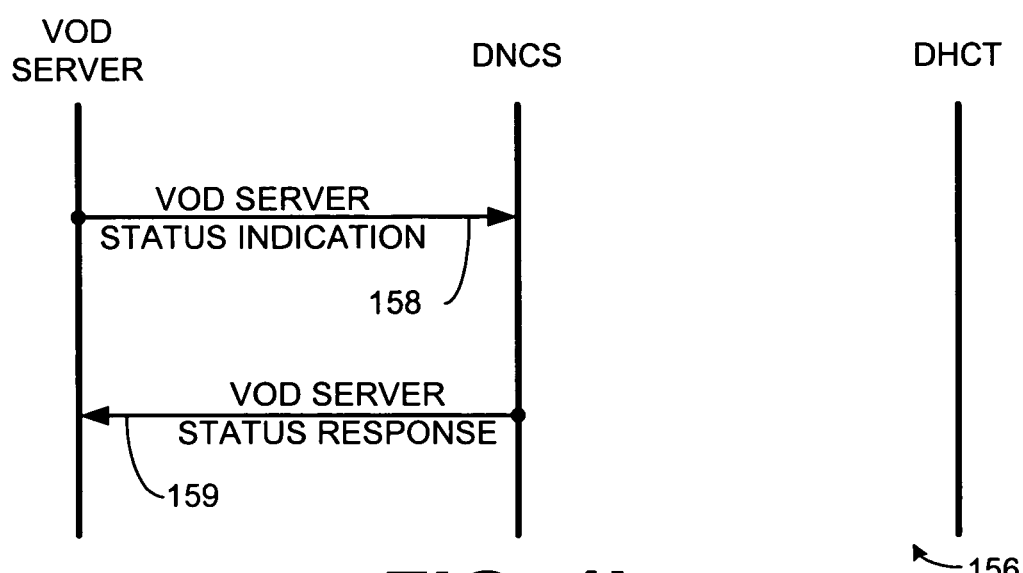

FIG. 4L is a display diagram 156 of a VOD content server 22 initiated session status request scenario. This procedure is used by a VOD content server 22 to query the DNCS 23 for sessions that the DNCS 23 is maintaining for that VOD content server 22. This procedure is also used to obtain detailed information about a session so that the MOD application server 19 may re-establish sessions after a reboot. In this case, the VOD content server 22 sends a service status request message 158 to the DNCS 23 to determine the status of the network 18. The DNCS 23 in this case responds with a service status confirm message 159 reporting on the status of the network 18.

Figure 4M:
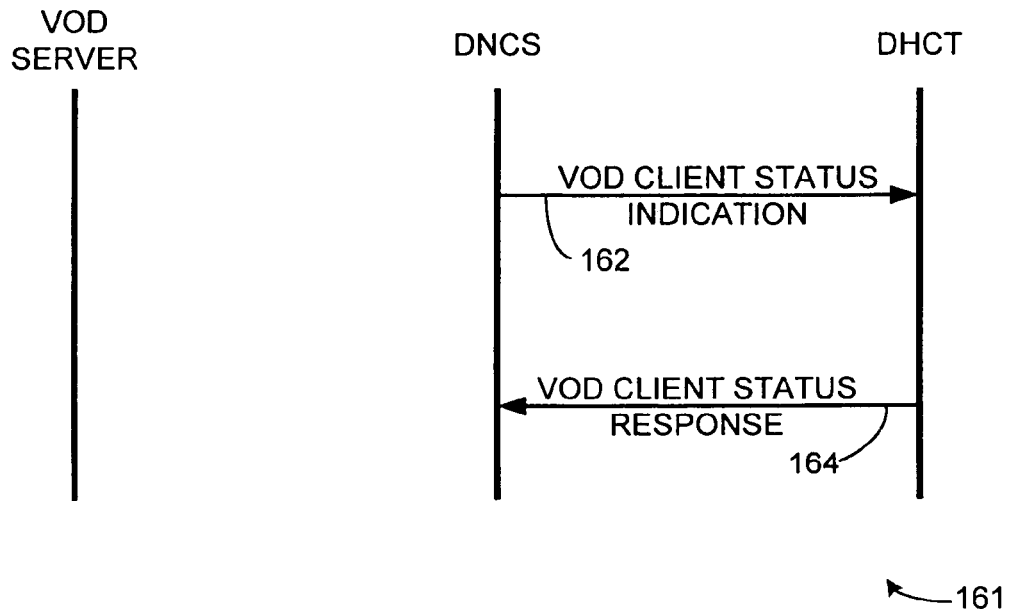
Figure 4M:
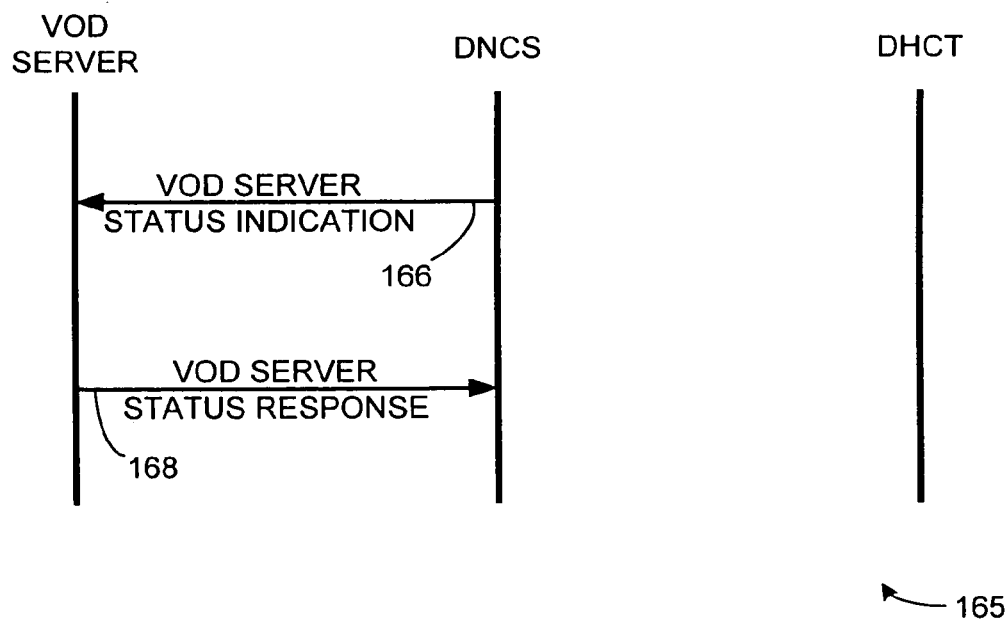

FIG. 4M is a display diagram of a network initiated client session status request 161 and a server session status request 165. This procedure is used by the DNCS 23 to query a DHCT 16 for the sessions that are currently active. This procedure is also used to obtain detailed information about a session so the DNCS 23 can determine if a session at the DNCS 23 is the same as the session maintained by the DHCT 16. In the client session status request scenario, the DNCS 23 initiates a client status indication message 162 to the DHCT 16 requesting status indication information. The DHCT 16 responds with a client status response message 164 to the DNCS reporting on the status of the MOD session. Similarly, the DNCS 23, in the server session status request 165, initiates a server status indication message 166 to the VOD content server 22. The VOD content server 22 responds with the status information in the form of a server status response message 168 to the DNCS 23 reporting on its status.

The section described above is descriptive of one system for implementing the MOD service of the preferred embodiment of the present invention. The section below is descriptive of the MOD application client 65 user interface flow for navigating and executing other aspects of the MOD service.

Figure 5:
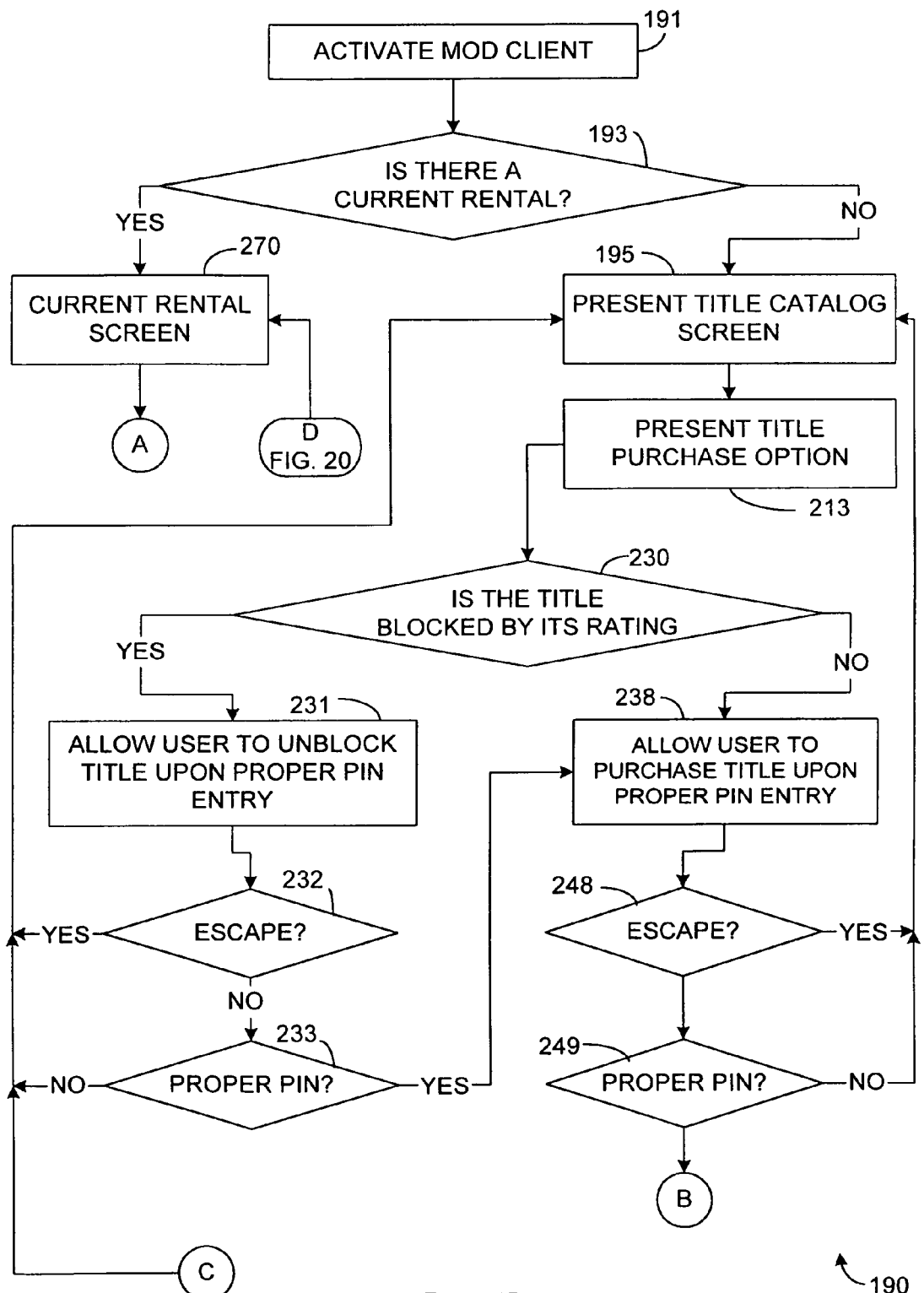
FIGS. 5 and 6 are flow chart diagrams of the user interface flow for providing the MOD service in the system depicted in FIG. 1.
Figure 6:
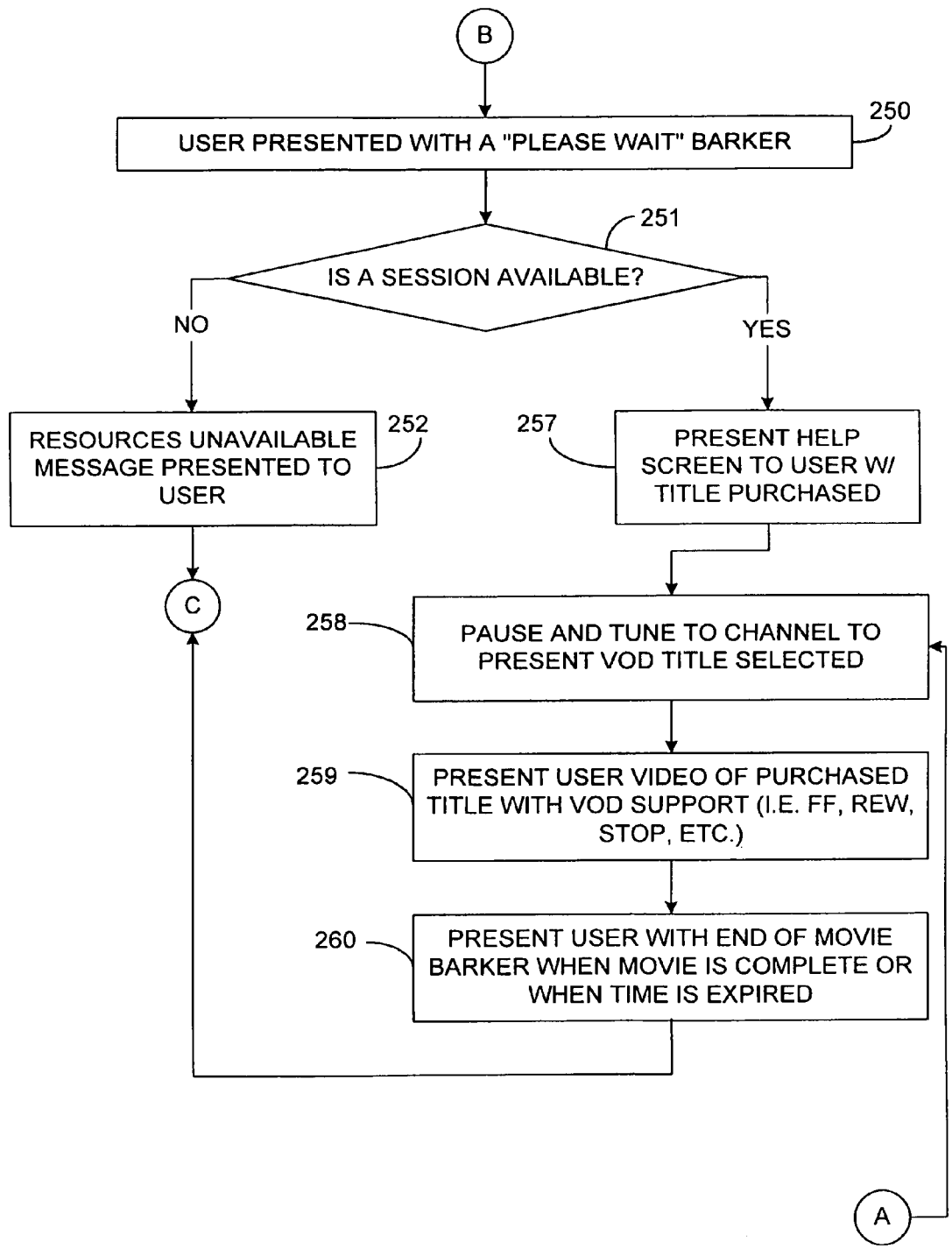

FIGS. 5 and 6 are flow chart diagrams of the user interface flow 190 for providing the MOD service (shown, in this non-limiting example, as a MOD service). The MOD application client 65 activates, as in step 191, prior to providing the MOD service. The MOD service may be activated, as in step 191, when the user tunes to the MOD service. The user may access the MOD channel in a variety of methods.

Figure 7:
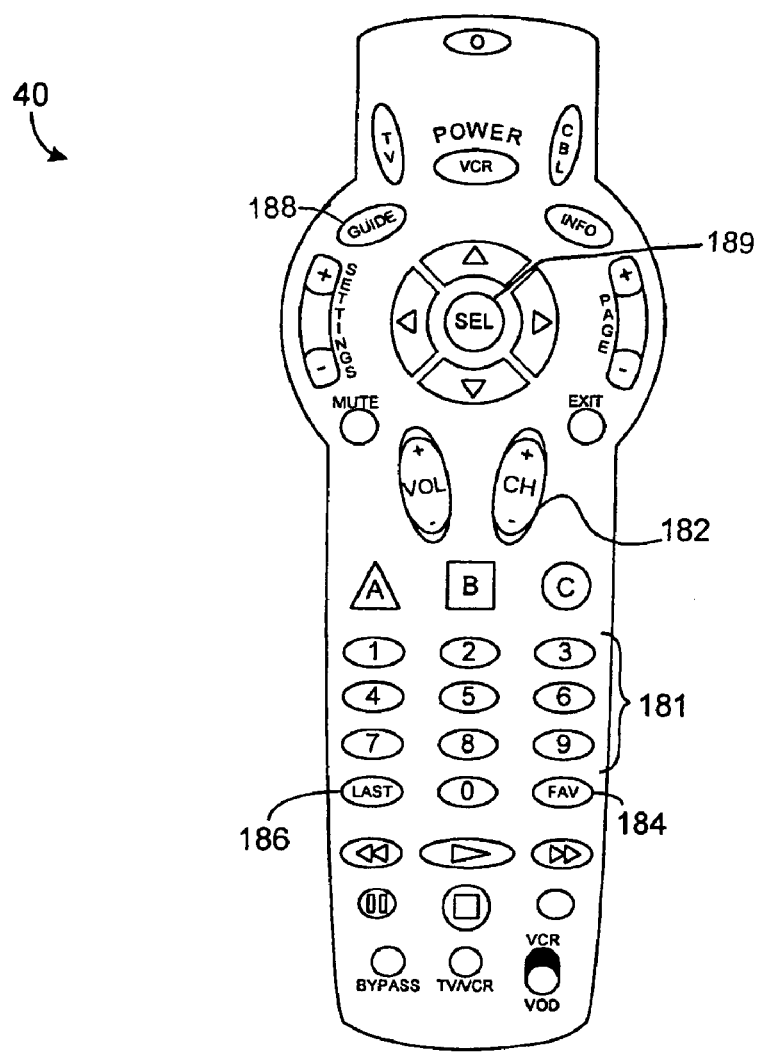
FIG. 7 is a diagram of a remote unit that communicates with the DHCT shown in FIG. 3.

FIG. 7 is a display diagram of remote unit 40, as a non-limiting example, that enables the user to access the MOD channel. The MOD channel may be accessed by direct channel number entry by numeric keys 181, the channel up/down button 182, by a favorite channels button 184, by a last-channel recall button 186, or by accessing a button dedicated for the interactive program guide (IPG) (not shown). The user may access the MOD channel via the service guide application (not shown) which, in one embodiment, may be activated by the "guide" key 188. Additionally, the user may be routed to the MOD channel from a "trailer" channel that links a user to the MOD channel if the user selects a particular trailer for purchase as it appears on the display 31.

Returning to FIG. 5, when the user tunes to the MOD channel, the navigator 51 asks the SAM 38 for the service mapped to the channel, which is a service provided by the MOD application. The navigator 51 then uses the SAM 38 to activate the MOD service. If the MOD application client 65 is not resident in the memory of the DHCT 16, the SAM 37 uses facilities of the operating system to download the MOD application client 65 using the BFS client 43. Once loaded in DHCT 16 memory, the MOD application client 65 is executed.

An activate service event is then delivered to the MOD application client 65. Contained in the event is the parameter data defined for the service by the MOD application server 19 when it was provisioned by the system operator. The parameter includes the URL for the MOD catalog on the BFS 28, 43, the IP address and port of the MOD application server 19, and other system operator configurable parameters such as the initial browse-by category to display the catalog screen, a trailer channel to tune upon activation, etc. as described in context below.

The first time the MOD application client 65 is activated, it connects to the MOD application server 19 and retrieve information about the user. The MOD application client opens a User Datagram Protocol (UDP) socket and sends the MOD application server 19 a request for current user information. The request includes a Media Access Control (MAC) address uniquely identifying the DHCT 16, and thus identifying the user. The MOD application server 19 then returns the requested user information, including but not limited to current rental information and user configuration information. This information has been stored in the MOD application server 19 database previously based on the MOD application client 65 creating VOD sessions and from commands from the MOD application client 65 over a UDP socket to store user configuration information. Both of these types of information are described in more detail in their relevant context below.

The MOD application client 65 then checks its internal state to determine if the user currently has any current rentals 193. If not, the MOD title catalog screen 197 (FIG. 8A) is displayed, as in step 195.

Figure 8A:
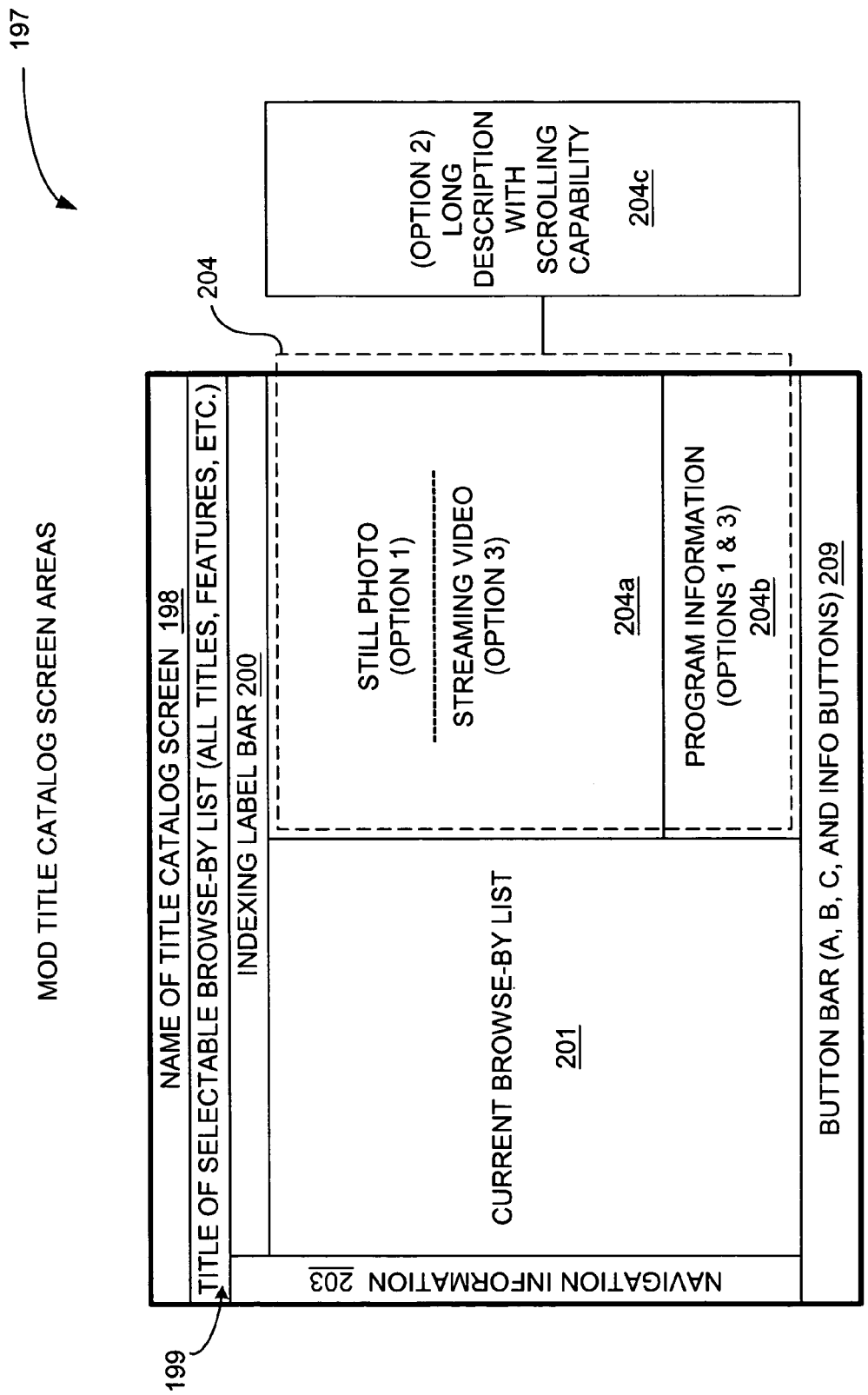
FIGS. 8A–8D are block diagrams of the MOD title catalog screen as described in FIG. 5.

FIG. 8A is a display diagram of the MOD title catalog screen 197 showing the available MOD titles for selection by the user. The MOD title catalog screen 197 includes a banner for the name of the tide catalog screen 198 at the top portion of the screen 197. The tide of the selectable browse by list 199 may be placed below the banner 198. The MOD title catalog server 197 may optionally include an indexing label bar 200. The user can sort through the available MOD tides in an area shown as the current browse-by list 201. The user may navigate the current browse-by tide list 201 by manipulating remote 40 (FIG. 7) as instructed by the graphics shown in the navigation information area 203. The navigation information area 203 may typically include images of selection arrows and selection buttons for choosing the desired MOD title from the current browse-by list 201. As yet another non-limiting example, a third option includes a full-screen title description page providing detailed information about a highlighted or selected MOD title. A button bar 209 is included at the bottom of the MOD tide catalog screen 197 for providing the user various options including renting the desired MOD title or even exiting the MOD application completely.

Information about a MOD title highlighted in the current browse-by list 201 may optionally be presented to the user in the right portion 204 of the MOD title catalog screen 197. As a non-limiting example, a first option includes a still photo 204a along with programming information 204b related to a highlighted MOD title in the current browse by list 201. As the user navigates through different MOD titles, the still photo 204a and the programming information 204b change accordingly. As another non-limiting example, a second option for the right portion of the MOD title catalog display includes a long description 204c that allows the user to obtain detailed information about the highlighted MOD title in the current browse by list 201. As still yet another non-limiting example, a third option includes presenting a streaming video portion in the location as described above for the still photo 204a and program information 204b similarly to option one described above. The streaming video may also be a reduced portion of a MOD title movie as a preview. The reduced portion of the MOD title may be any segment of the MOD title of length set by a system operator at headend 11. The video shown as a preview may either be the video of the title highlighted in the current browse-by list 201 or any other MOD title.

Figure 8B:
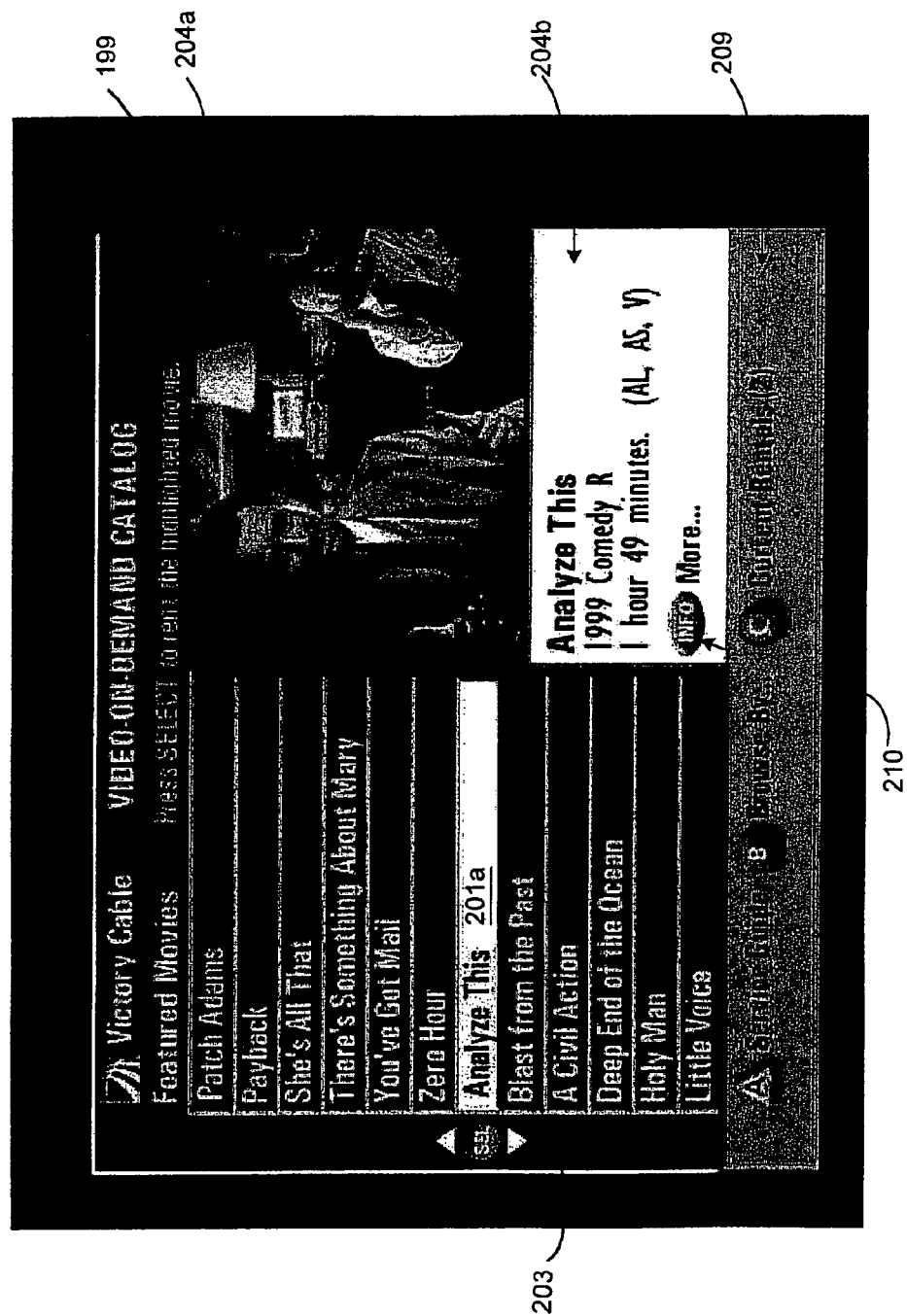

FIG. 8B is a display diagram of the MOD title catalog screen 197 that depicts MOD title selection information and options one and three as described above. In this non-limiting example, "Featured Movies" is shown in the title of selectable browse-by list 199. The navigation information 203, in this non-limiting example, includes an up/down arrow plus a "SEL" key for selecting the desired MOD title. Also in this non-limiting example, the highlighted movie in the current browse-by list 201 is "Analyze This" 201a. On the right portion of the MOD title catalog screen 197 may be previously discussed option one or three including still photo or steaming video 204a and program information 204b. INFO button 210, alternatively, may be configured by a system operator interface (not shown) to provide a trailer or preview of the highlighted MOD title 201a in the portion 204a if a still image was previously shown, as in the non-limiting example as shown in FIG. 8B. In one embodiment, a full screen or reduced screen movie trailer or MOD title preview is provided when the user selects the INFO button.

The button bar 209 at the bottom portion of the title catalog screen 197 includes options for the "A," "B," and "C" keys of remote unit 40 (FIG. 7). Continuing with this non-limiting example, pressing the "A" key activates another application known as the service guide (not shown). Depressing the "C" key on the remote unit 40 (FIG. 7), as shown in the button bar 209, takes the user to a current rental screen. Finally, depressing the "B" key brings up a browse-by menu for the user to change the browse-by list category 199 and this is discussed in more detail below.

To present a preview of a MOD title in the reduced portion 204a as described above, the actual MOD title MPEG content contained on the VOD content server 22 (FIG. 2) is delivered to the DHCT 16 and displayed in portion 204a. The preview is separate from a "trailer" in that a trailer is a pre-edited portion of the MOD title separate from the MPEG content while the preview is the actual data stream of the MOD title. Thus, option three, as described above, may be configured to provide either a trailer or a preview in portion 204a.

Figure 8C:
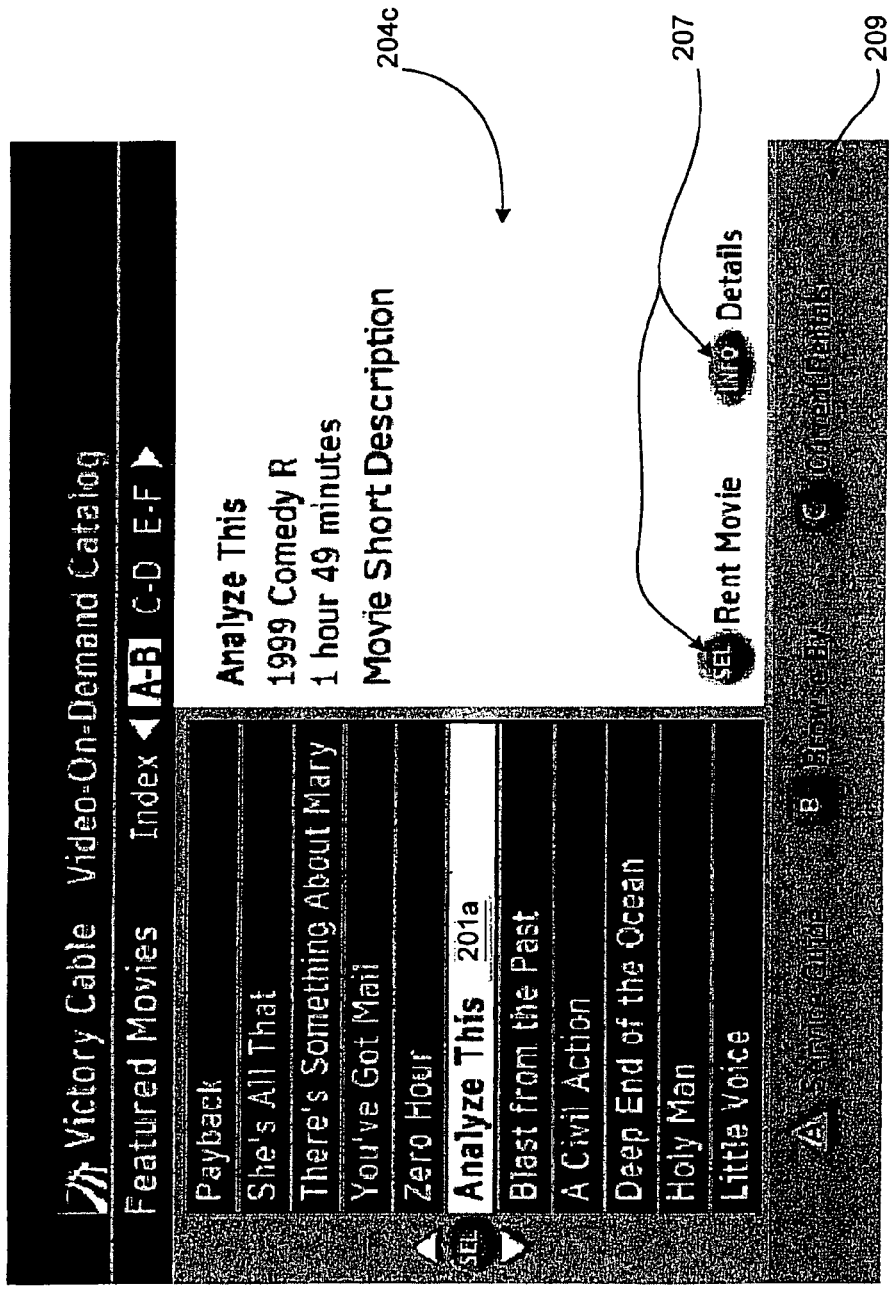

FIG. 8C is a display diagram of the MOD title catalog screen 197 configured as option two as described above. In this non-limiting example, a description of the MOD title highlighted 201a in the current browse-by list 201 is shown in right portion of 204c. In this non-limiting example, selectable buttons 207 may be included in the right portion 204c providing additional options to those shown in button bar 209.

Figure 8D:
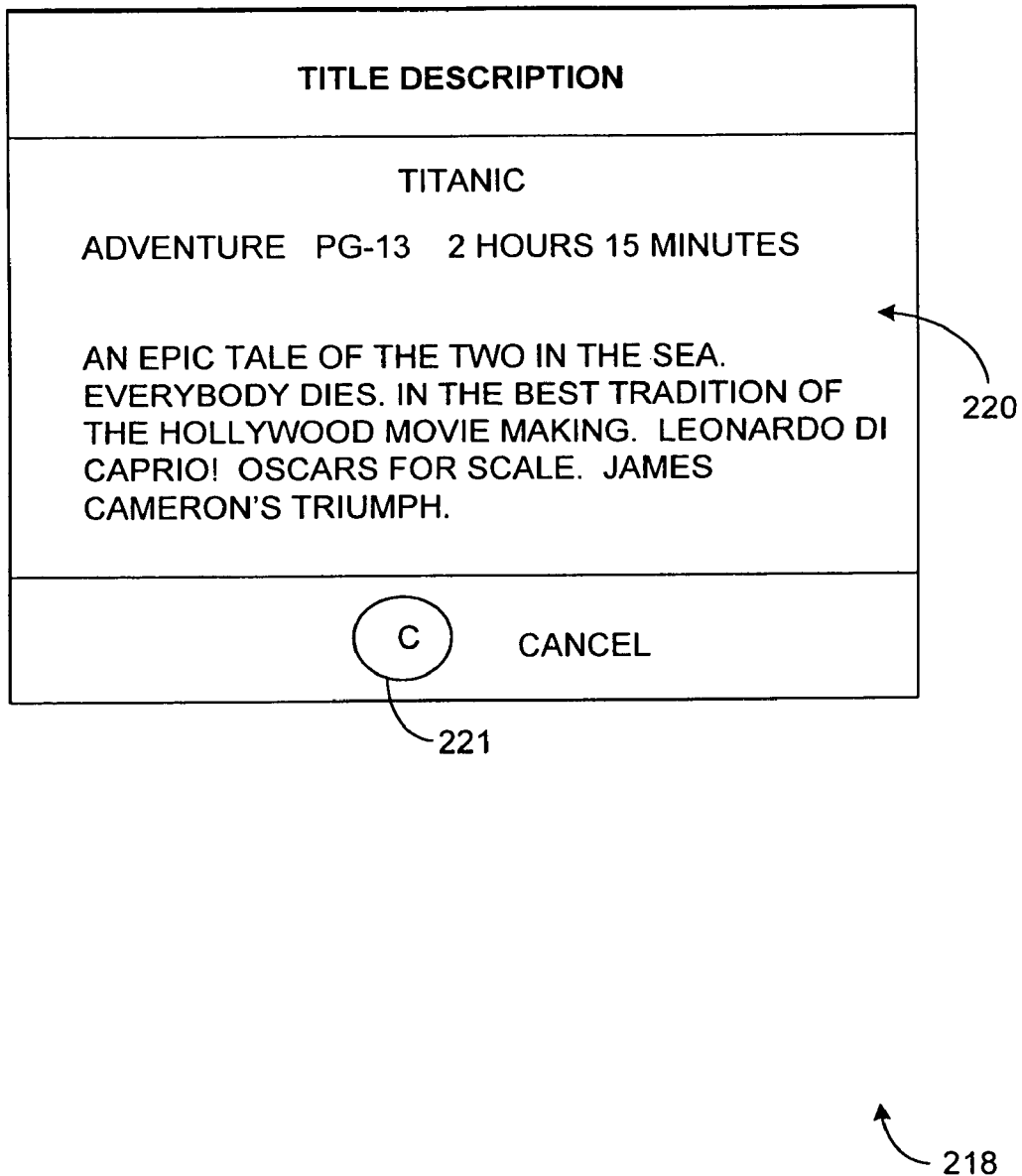

FIG. 8D is a display diagram of a title description screen 218 (option four) presented to the user upon request from the MOD title catalog screen 197 in FIG. 8A. The title description screen 218 is a full screen view. In a center portion of the display 220, detailed descriptive information is presented. The user is presented a cancel option 221 which re-displays the MOD title catalog screen 197. If the title information is larger than that available on the screen, scrolling capability is provided via arrow input keys for the user to view the entire title information.

Figure 9:
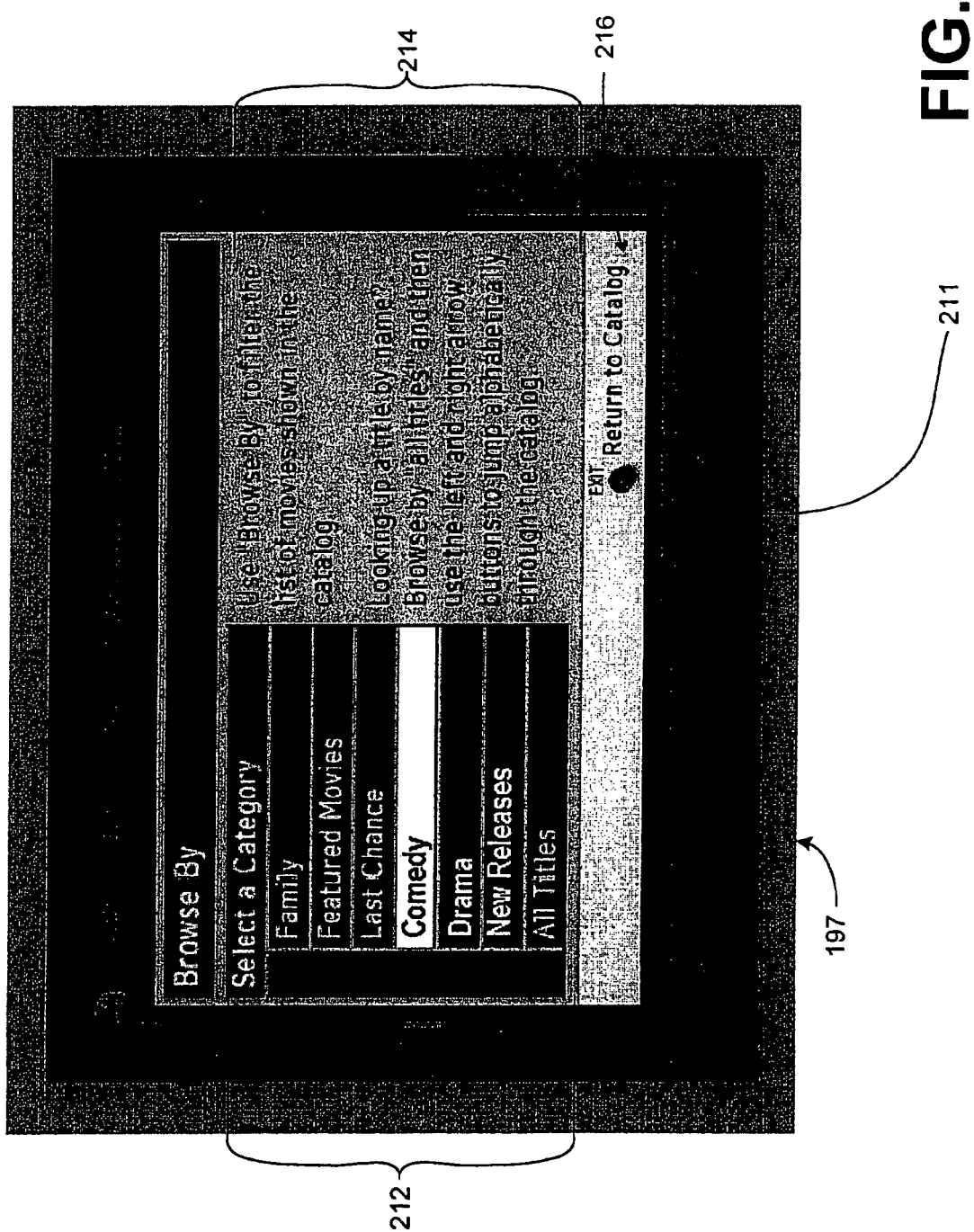
FIG. 9 is a display diagram of the MOD title catalog screen shown in FIG. 8B with a browse-by screen overlaid on top of the MOD title catalog screen.

The MOD title catalog screen 197 (FIG. 8A) also allows the user to change the current browse-by list 201 to different catalog groupings. FIG. 9 is a display diagram of the MOD title catalog screen 197 with a browse-by screen 211 overlaid on top of the MOD title catalog screen 197. The browse-by screen 211 appears with choices for sorting all available MOD tides in a category selection portion 212, a plurality of categories of browse-by options. In a description portion 214 of the browse-by screen 211, a brief description is displayed about a highlighted category in the selected category portion 212. The various categories are essentially filters of all the movies shown under individual title category listings in the browse-by screen 211. As non-limiting examples, various browse by catalog categories include all titles, actor, action/adventure, adult, comedy, drama, family, rating, new releases, last chance, specials, among others. Once the user selects a category from the browse-by screen 211, the browse-by screen 211 disappears and the current browse by list 201 (FIG. 8A) displays the new set of MOD titles for the selected category. The user may alternatively exit the browse-by screen 211 without changing the title display by following instructions shown in a bottom portion 216 of the browse-by screen 211.

A separate browse-by screen (not shown) allows the user to search the MOD title catalog for a desired MOD title. This embodiment includes a blank field where the DHCT 16 accepts user input for a specific MOD title to search. The search request is transferred from the DHCT 16 to the headend 11. Results of the search are returned to the DHCT 16 and are presented to the user.

The titles presented in the MOD title catalog screen 197 that are grouped in the various title categories are arranged by a system operator through an interface (not shown) at the headend 11. The interface is provided by the MOD application server 19 (FIG. 2). The interface enables the system operator to configure separate catalogs and also the various title categories within each catalog. Mapping of titles to category is 1:N, and can be defined by the system operator via the MOD application server GUI.

Whenever a catalog or title category is updated or created, the catalog manager of the MOD application server 19 generates and updates the catalog file(s) using the BFS server 28 (FIG. 2). As described above the BFS server 28 is in constant communication with a BFS client 43 (FIG. 3) in the DHCT 16 to provide updates and new applications to the DHCTs 16 in the cable television system 10 (FIG. 1).

Table I is a header file that is a pseudo-structure that describes the format of the MOD title catalog file as described above. Data types are indicated as follows: ui8=unsigned 8-bit integer; ui16=unsigned 16-bit integer; ui32=unsigned 32-bit integer.

TABLE 1

MOD TITLE CATALOG FORMAT

```
/* File Header */
ui16    format;                         /* file format identifier */
ui16    version;                        /* construction generation
                                           number */
ui16    service Id;                     /* identifier of MOD catalog
                                           channel */
ui32    VODContentServerAddress;        /* Server address where titles
                                           are stored */
ui8     language [3];                   /* display language code */
/* rating string heap */
ui8     ratingCount;                    /* number of strings in the rating
                                           heap */
ui16    ratingOffsets[ratingCount];     /* offset to each string in the rating
                                           heap */
ui16    rating Bytes;                   /* total size, in bytes, of the rating
                                           heap */
ui8     ratingHeap[ratingBytes];        /* heap of rating strings */
```

TABLE 1-continued

MOD TITLE CATALOG FORMAT

```
/* theme string heap */
ui8     themeCount;                     /* number of strings in the theme
                                           heap */
ui16    themeOffsets[themeCount];       /* offset to each string in the theme
                                           heap */
ui16    theme Bytes;                    /* total size, in bytes, of the theme
                                           heap */
ui8     themeHeap[themeBytes];          /* heap of theme strings */
/* cost string heap */
ui8     costCount;                      /* number of strings in the cost
                                           heap */
ui16    costOffsets[costCount];         /* offset to each string in the cost
                                           heap */
ui16    costBytes;                      /* total size, in bytes, of the cost
                                           heap */
ui8     costHeap[costBytes];            /* heap of cost strings */
/* title string heap */
ui16    titleCount;                     /* number of strings in the title
                                           heap */
ui32    titleOffsets[titleCount];       /* offset to each string in the title
                                           heap */
ui32    titleBytes;                     /* total size, in bytes, of the title
                                           heap */
ui8     titleHeap[titleBytes];          /* heap of title strings */
/* description string heap */
ui16    descCount;                      /* number of strings in the desc
                                           heap */
ui32    descOffsets[descCount];         /* offset to each string in the desc
                                           heap */
ui32    descBytes;                      /* total size, in bytes, of the desc
                                           heap */
ui8     descHeap[descBytes];            /* heap of desc strings */
/* actors string heap */
ui16    actorCount;                     /* number of strings in the actors
                                           heap */
ui32    actorOffsets [actorCount];      /* offset to each string in the actors
                                           heap */
ui32    actorBytes;                     /* total size, in bytes, of the actors
                                           heap */
ui8     actorHeap [actorBytes];         /* heap of actor strings */
/* rental options heap */
ui8     rentOptionsCount;
for (idx = 0; idx < rentOptionsCount; idx += 1)
{
    ui16    rentDuration;               /* rental period duration
                                           (minutes) */
    ui8     costIndex;                  /* index to the cost strings heap */
    ui8     rentId;                     /* identifier of rental plan */
    ui16    rentFlags;                  /* flags indicating support for
                                           trick modes, trailers, and
                                           other rental option attributes */
}
/* MOD program title catalog entries (sorted alphabetically by title) */
ui16    MODCount;                       /* number of entries in the
                                           catalog */
for (idx = 0; idx < MODCount; idx += 1)
{
    ui32    titleId;                    /* unique identifier for a
                                           program */
    ui16    titleIndex;                 /* index to title string in title
                                           heap */
    ui16    descIndex;                  /* index to description string in
                                           desc heap */
    ui16    length;                     /* length of the program
                                           minutes */
    ui16    year;                       /* year of the title */
    ui8     rating;                     /* index to the rating string in
                                           rating heap */
    ui8     themeCount;                 /* number of themes */
    ui8     themes [themeCount];        /* array of indices to the theme
                                           heap */
    ui16    cancelPeriod;               /* cancelation period for the title */
    ui8     rentCount;                  /* number of rental options for the
                                           title */
    ui8     rentalOptions [rentCount];  /* array of indices to the rental
                                           options heap */
    ui8     actorCount;                 /* number of actors in the movie */
```

TABLE 1-continued

MOD TITLE CATALOG FORMAT

| ui16 | actors [actorCount]; | /* array of indices to the actors heap */ |

Upon addition of a new MOD catalog or title category to the BFS server 28, the new files are immediately broadcast across the network 18 at intermittent intervals enabling the MOD application client 65 on each DHCT 16 to receive the updated information. To notify the MOD application client 65 that new catalog files are available, the MOD application server 19 uses the DSM-CC 34 on the DNCS 23 to send a UDP pass-thru message to the MOD application client 65 via the operating system of the DHCT 16. Each MOD application client, upon determining that a new catalog or an updated version is available, uses the BFS client 43 (FIG. 3) in the DHCT 16 to download the files and store them in the MOD application client 65 database (not shown). The updated version of the files are implemented the next time the user activates the MOD title catalog screen 197. Alternatively, the MOD application client 65 may chose to wait until the user activates the MOD service to load the most recent version of the MOD catalog for display at that time.

Similarly, when new MOD titles are available for sale or release, a system operator adds the MOD titles to the MOD application server 19. The MOD application server 19 (FIG. 2) provides both a graphical user interface (GUI) and an API interface to install a MOD title asset onto the system. Typically this is done by, as a non-limiting example, inserting media such as a tape into the MOD application server 19 and using the graphical user interface (GUI) to define the meta-data about the title, but this process can be automated via the use of APIs (Application Programming Interfaces). The MOD title includes MPEG video assets for the title and optionally a trailer, as well as meta-data about the title. Meta-data includes but is not limited to data about the title, such as it's name, description, rating, directors, actors, length, etc. The MOD application server 19 assigns a unique title ID and installs the added MOD titles to the VOD content server 22 by transferring title ID and MOD title MPEG content. The VOD content manager 21 adds the MPEG content to the VOD content servers 22. The MPEG content for each newly added MOD title may include not only the video (or other media), but may also include MPEG data for a trailer for the MOD title that may be later included on a trailer channel or in the MOD title catalog screen 197 in portion 204*a* as described above.

The system operator at the headend 11 may configure multiple MOD services to display different MOD title catalog screens 197; as mentioned previously each MOD service includes a URL for the catalog to be used by that service. The different services (and thus catalogs) may be constructed based on demographic information for different types of users according to geographic origin, ethnicity, age, gender, etc. provided such information is known about subscribers in the system. As part of the mapping of MOD services to channels provided by the SAM server 38, the operator may assign different MOD services with different catalogs to different geographic hubs in the television network. As a non-limiting example, the MOD title catalog screen 197 may predominately display MOD title categories tailored to Spanish programming, and these MOD title catalog screens 197 may be implemented in geographical areas where the interest in Spanish programming is high.

Alternatively, the system operator can create a separate MOD service with a title catalog of adult content separate from the main library of titles. This adult MOD service may then be offered on a separate channel as a premium service to subscribers interested in that content. Thus, different MOD title catalog screens 197 are maintained at the headend 11 for presentation to users of varied interests.

Similarly, the MOD application client 65 on the DHCT 16 may be configured by the user to display MOD title categories in the MOD title catalog screen 197 according to interests for the individual user, if so configured by the system operator. As a non-limiting example, users with interests in sports programming may configure the DHCT 16 to display categories pertaining to sports programming in the MOD title catalog screen 197 as opposed to a regular configuration. When configured via the MOD application server GUI to operate in this mode, a single catalog contains all categories. Thus, the BFS server 28 at headend 11 would continuously broadcast all MOD title catalogs, but the DHCT 16 of the user with interest in sports programming would display the MOD title catalogs and MOD title categories pertaining to sports programming. The DHCT 16 may still download all MOD title categories so the user may still view MOD titles under those categories also, but separate action would be taken to display those categories. The list of categories desired for each individual user can be stored in non-volatile memory (NVM) (not shown) on the DHCT 16 if available. Preferably, the list of categories is transmitted over a UDP/IP socket to the MOD application server 19 by the MOD application client 65 using facilities of the digital television network 18. The MOD application client 65 then requests user information once after it is first initialized, as described previously. A settings graphical user interface offered by the MOD application client 65, if enabled by the system operator in the MOD service parameters, can be accessed by the user to set the list of categories that they desire be displayed. In navigating the MOD title catalog screen 197 to select a MOD title to purchase, the user may opt to preview a MOD title contained in the MOD title catalog screen 197. A preview of a MOD title enables the user to view a portion of the MOD title video stream substantially less than the entire title length. The preview may not necessarily start at the beginning of the MOD title, but rather may be any segment or segments of the MOD title. The portion of video contained in the preview may be configured by the system operator at the headend 11 through an interface (FIG. 22). The interface enables the system operator to set the length and starting point of the preview. The preview is displayed by the MOD application client 65 setting up a session with the VOD content server 22 for the specified title ID starting at the specified Normal Play Time (NPT) location. VOD stream control mechanisms (i.e., fast-forward, rewind, pause) are typically disabled during the preview. Once the user has viewed the entire preview, the user chooses whether to rent the MOD title just previewed. If not, then the DHCT 16 returns to the MOD title catalog screen for further navigation or exit.

Figure 10:
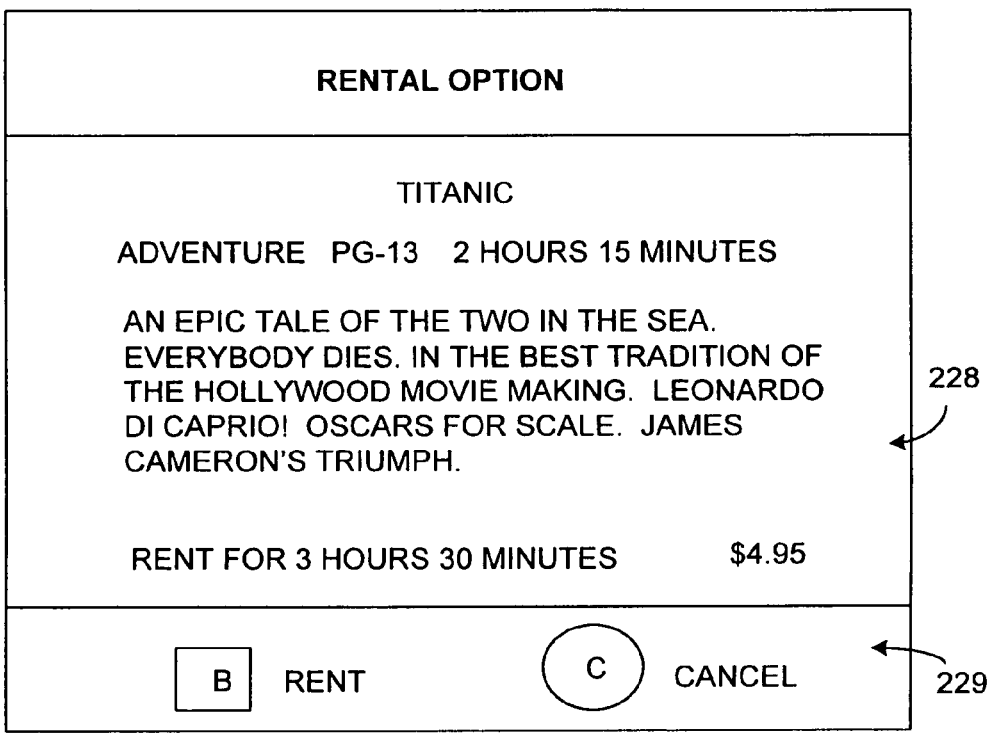
FIG. 10 is a display diagram of a rental option screen as one embodiment of the title purchase option described in FIG. 5.

Returning to FIG. 5, once the user navigates through the MOD title catalog screen 197 and chooses a MOD title for purchase, DHCT 16 presents the user a title purchase option, as shown in step 213. FIG. 10 is a display diagram of a rental option screen 227 as one embodiment of the title purchase option described in step 213 (FIG. 5). Descriptive information about the selected MOD title is shown to the user in a center portion of the display 228. Contained in this descriptive information is one or more "rental options": including both the rental period and rental price for the selected MOD title. In one rental option, the rental period may be the MOD title length—thereby requiring the user to immediately rent the MOD title and view it in its entirety at the time of rental. In another rental option, the rental period in the descriptive portion of the display 228 may be some integer multiplier of the MOD title length. As a non-limiting example, the rental period, as configured by the system operator at the headend 11 may be set to 2 times the MOD title length, so a two hour movie would enable a rental period of four hours. As yet another rental option, the rental period may be set to a specific period of time, such as a period of hours, days, or weeks. The price of the rental is included in the descriptive portion of the display 228 and may vary according to the popularity of the MOD title, the length of rental, and other variables as discussed in more detail below. Finally, if the user desires to rent the selected MOD title shown in the rental option screen 227 (FIG. 10), the user may depress a button on the remote 40 (FIG. 7) as directed in the rental option button bar 229. A cancel option may similarly be presented in the rental option button bar 229 that returns the user to the MOD title catalog screen 197. If more than one rental option is provided for the title, the rental option screen 227 includes a scrolling list of rental options.

An additional rental options that may be presented to the user in rental option screen 227 (FIG. 10) include, as a non-limiting example, providing the user limited or unlimited control of VCR-like stream control functions (i.e., stop, fast-forward, rewind, pause, etc.). The rental price of the MOD title may be based on the amount of control the user has in implementing the MOD functions. Thus, the user may pay a higher price to rent a MOD title with full functionality as opposed to renting a MOD title with no functionality since bandwidth for the MOD title would be used for a shorter period of time if the user did not have the ability to stop, rewind, or pause the MOD title.

Still yet another rental option that may be purchased by the user from the rental option screen 227 (FIG. 10) is the ability to view a MOD title multiple times during the rental period rather than merely once. As a non-limiting example, the rental options screen 227 (FIG. 10) may include an option that enables the user to view the purchased MOD title a set number of times greater than one during the rental period or even an unlimited number of times during the rental period.

As another rental option, the user may select to view a MOD title without any promotional advertising. As a non-limiting example, a user, upon selecting such an option, may view a MOD title without any movie trailers that are commonly shown in movie theaters prior to the feature presentation. As another non-limiting example, the MOD title may be presented to the user without any advertising logos, brands, or other marks that might otherwise be included in the presentation of the MOD title.

A MOD application server 19 graphical user interface (GUI) allows the system operator to define any number of rental options such as those mentioned above. Defined in the catalog is the information about each rental option: description, price, VOD stream control mechanisms enabled, trailers enabled, advertising enabled, etc. such that the MOD application client 65 can enforce the chosen rental option for a title. The system operator can assign via the GUI any number of rental options to a given title, including a default list of rental options that is assigned to a title when it is installed.

As still yet another rental option, the user may have the option to change the language setting of the purchased MOD title to one of any other available languages from the default setting. The MPEG data stream of the MOD title as delivered to the DHCT 16 may include two or more language audio tracks such that the DHCT 16 may be configured to play an alternately chosen language according to the preference of the user. As a non-limiting example, a French speaking user may configure the DHCT 16, by an interface (not shown) presented by the MOD application client 65, to present the purchased MOD title in French language audio as opposed to, for example, an English language default setting. Additionally, the DHCT 16 may, upon the user initially configuring the language, set the default for future presentations to the newly selected language. Alternatively, the MOD application client may access the language settings of the navigator 51 (FIG. 3) and present all purchased MOD titles according to that language setting—provided the chosen language is one included in the MPEG audio track of the MOD title.

Once the user purchases a particular MOD tide from the rental options screen 227 (FIG. 10) but prior to presentation of the title, the MOD application client 65 determines if the title is blocked by its particular rating, as shown in step 230 (FIG. 5). To determine if a particular MOD title is blocked because of its rating, the user should have previously entered a setting in the DHCT 16 defining what types of ratings would be acceptable for viewing. In the preferred embodiment this information is maintained by the resident navigator application 51 and made available to other application clients via an application programming interface (API). The MOD application client 65 accesses the pre-configured rating parameters for comparison to the rating information contained in the catalog for the subject MOD title being purchased. As a non-limiting example, if a user configured the DHCT 16 to prevent any movie with an "R" rating from being viewed or purchased, the MOD application client 65 would not allow any movie with such rating to be purchased or viewed unless specifically overridden by the user. In this non-limiting example, parents may choose to block MOD titles with "R" ratings to prevent children from accessing the MOD titles while allowing the parents to access the blocked titles upon entry of a proper PIN. Thus, if the MOD application client 65 determines in step 230 that the selected MOD title is blocked by its rating, the application client 65 allows the user to unblock the title on a proper PIN entry, as shown in step 231. In the preferred embodiment, the MOD application client 65 uses the "blocking PIN" number stored in the settings with the navigator 51 application. As such, a user can configure a single parental control PIN that is shared among applications. The user is allowed to escape or cancel from the PIN entry screen for overriding the title blocking according to rating, as shown in step 232. If the user chooses to escape the PIN entry screen or enters an improper or incorrect PIN, as shown in step 233, the MOD application client 65 returns the user to the MOD title catalog screen 197 where the user reinitiates the MOD purchase sequence described above.

Figure 11:
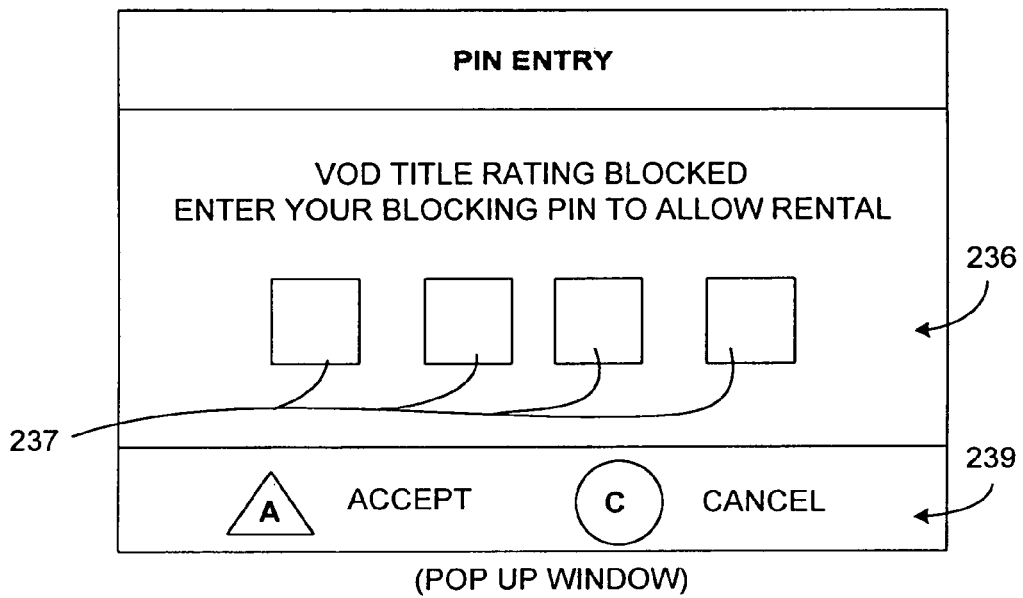
FIG. 11 is a display diagram of a PIN entry screen presented subsequently to the rental options in FIG. 10 indicating that the selected MOD title is blocked because of its rating and providing a personal identification (PIN) entry to access the blocked MOD title.

FIG. 11 is a display diagram of a PIN entry screen 231 presented to the user indicating that the selected MOD title is blocked because of its rating and providing a personal identification (PIN) entry to access the blocked MOD title. The PIN entry screen 231 is a pop-up window that is overlaid over the rental entry screen 227 (FIG. 10). The PIN may consist of any alphanumeric character or other non-alphanumeric character. The center portion 236 of the PIN entry 231 includes a message requesting PIN entry and several blocks 237 representing the requisite number of characters to be entered. The user may enter the PIN to access a blocked title with the remote 40 (FIG. 7). Upon entry of each character, an asterisk may appear in each block 237 signifying entry of a character. Once the user enters the PIN, the user may request acceptance of the PIN by inputting the "A" key on remote 40 (FIG. 7) as instructed by the PIN entry button bar 239. Similarly the user may cancel the PIN entry override process, as in step 232 (FIG. 5), by entering the "C" key on remote 40 (FIG. 7) as instructed by the PIN entry button bar 239. If the user enters in an improper PIN number in step 233 (FIG. 5), the MOD application client 65 returns the user to the present title catalog screen 197.

In another embodiment, the user may configure the MOD application client 65 through a graphical user interface menu (not shown) to block certain MOD titles grouped under certain themes. As a non-limiting example, a user may configure the DHCT 16 to block all MOD titles under an "Adult Programming" theme if such a theme was included in the browse-by category list 211 (FIG. 9). If the user attempted to access the "Adult Programming" theme, the DHCT 16 would present a PIN entry screen similar to the PIN entry screen 231 shown in FIG. 11. Thus, the user would be asked to enter the correct PIN as described above to access the blocked "Adult Programming" theme. Information for the categories set by the user as blocked may be stored in NVM by the MOD application client if space is available on the DHCT 16. Alternatively, the MOD application client 65 may send a UDP/IP message to the MOD application server 19 to store the blocking information for the particular user in the MOD application server 19 database (not shown).

In yet another embodiment, the user may configure the MOD application client 65 to block rental of MOD titles according to some pre-set limits on media service. As a non-limiting example, the DHCT 16 may block presentation of MOD titles after a certain number of successful requests have been made in a given time period. Thus, a user may configure the DHCT 16 to allow five MOD title rentals in a month to control costs. In another non-limiting example, the user may limit the rental of MOD titles after a certain number of requests of a particular type of media has been ordered. Thus, the DHCT 16 may limit rental of all MOD titles after the user has ordered five premium-priced MOD title rentals. Additionally, the user, in another non-limiting example, may limit rental of all MOD titles after a specific monetary value has been expended in a given time period. Thus, the user may set a $50.00 per month for MOD title rental, and after that amount has been spent, the DHCT 16 blocks further rental attempts unless the user overrides the blocking process by entering the PIN. In each of these non-limiting examples, the user can override the block placed on the rental by entering a proper PIN as described above. All of this user-configured blocking information is stored in the MOD application server 19 database (not shown) as described for previous user configurations.

Figure 12:
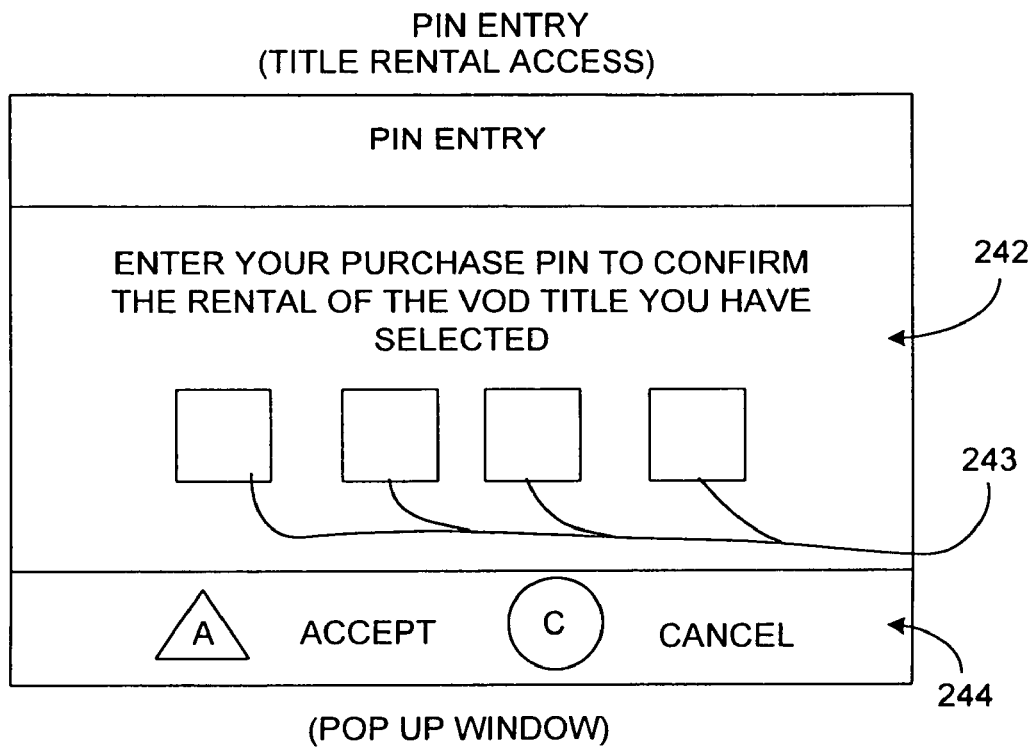
FIG. 12 is a display diagram of a title rental access PIN entry screen presented to the user requesting PIN confirmation of purchase of the MOD title previously selected from the MOD title catalog screen in FIG. 8A.

If the MOD application client 65 determines that the selected MOD title is not blocked by any of the aforementioned parameters, as in step 230 (FIG. 5), or the user overrides the blocking process, as in step 233, the MOD application client 65 presents the user with a title rental access PIN entry screen 240, as in step 238 (FIG. 5). FIG. 12 is a display diagram of a title rental access PIN entry screen 240 presented to the user requesting PIN confirmation of purchase of the MOD title previously selected. Similarly as above, the PIN may consist of any alphanumeric character or other non-alphanumeric character. In one embodiment, the MOD application client 65 retrieves the value of the PIN from the API of the navigator 51 application on the DHCT, such that a single "purchase PIN" can be used for the user across multiple applications that deal with purchases. The center portion 242 of the title rental access PIN entry screen 240 includes a message requesting PIN entry and several blocks 243 representing the requisite number of characters to be entered. The user may enter the PIN to access a blocked title with the remote 40 (FIG. 7). Upon entry of each character, an asterisk may appear in each block 243 signifying entry of a character. Once the user enters the PIN, the user may request acceptance of the PIN by inputting the "A" key on remote 40 (FIG. 7) as instructed by the PIN entry button bar 244. The user may also cancel the PIN entry override process, as in step 248 (FIG. 5), by entering the "C" key on remote 40 (FIG. 7) as instructed by the PIN entry button bar 239. If the user enters in an improper PIN number in step 249, the MOD application client 65 returns the user to the present title catalog screen 197 as previously discussed.

Figure 13:
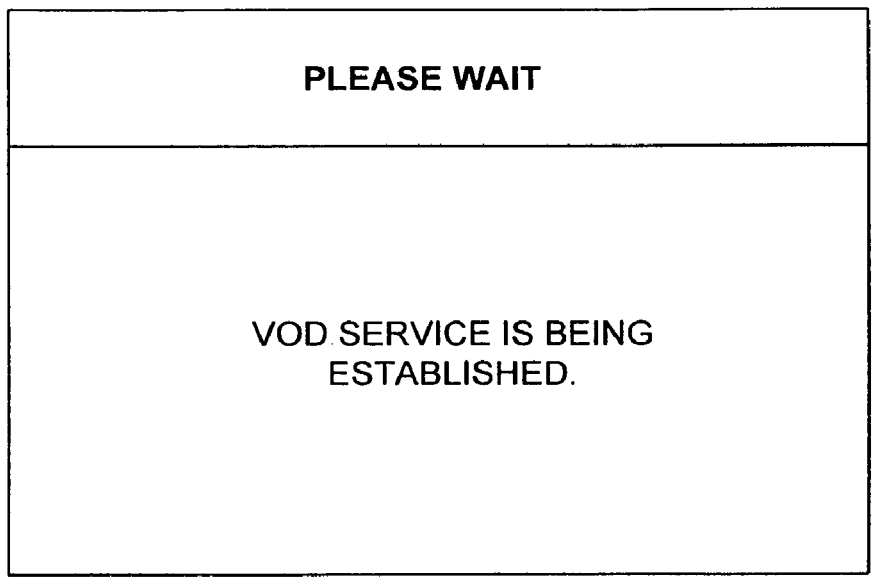
FIG. 13 is a display diagram of the please wait barker presented to the user while service is established from the headend (FIG. 2) to the user's DHCT (FIG. 3).

After the user has selected the desired MOD title for purchase, the MOD application client 65 causes the DHCT 16 to present the user a "please wait" message, as in step 250 (FIG. 6) while the MOD service is being established as described above. FIG. 13 is a display diagram of the please wait barker 253 presented to the user while service is established from the headend 11 to the user's DHCT 16. Establishing service entails setting up a VOD session with the specified VOD content server identified for the title in the catalog. The barker 253 merely is a pop up window that appears for the duration of the delay that may typically last a few seconds.

Figure 14:
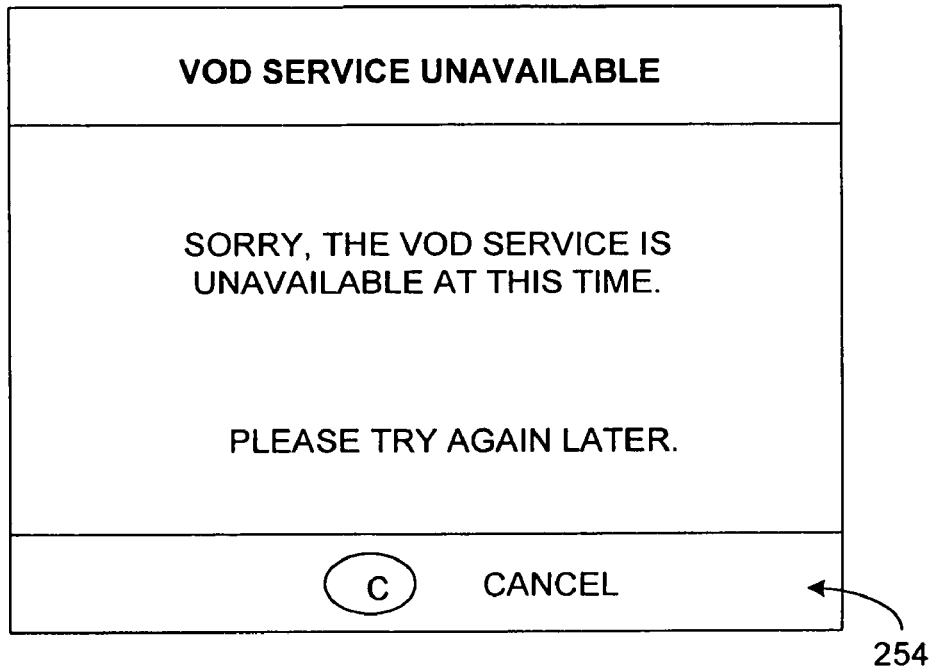
FIG. 14 is a display diagram of the MOD service unavailable barker presented to the user indicating that the purchased MOD title (from the MOD title catalog screen (FIG. 8A)) cannot be presented at the requested time.

Returning to FIG. 6, while the please wait barker 253 is presented to the user, a determination is made whether the MOD session can be established, as shown in step 251. The session is established as discussed above if the resources of the system 10 (FIG. 1) are available. If resources are unavailable at the time the user desires to view the MOD title, a message is presented to the user stating that the MOD service request cannot be fulfilled at that time, as in step 252. FIG. 14 is a display diagram of the MOD service unavailable barker 252 presented to the user indicating that the purchased MOD title cannot be presented at the requested time. In the embodiment shown in FIG. 14, the user is informed to try again later; however, in another embodiment, the user may be provided an opportunity to receive the MOD service at some point in the future by reserving the selected MOD title for a set future time. From the MOD service unavailable screen 252, the user is presented with the title catalog screen 197 upon entering a cancel command as instructed in a bottom portion 254.

If a session is available for transmitting the MOD title from the VOD content server 22 to the DHCT 16, the user is presented a help screen (actual help screen not shown) with the title purchased, as in step 257, prior to presenting the MOD title on display 31 (FIG. 3). This screen may include instructions about how the remote unit 40 (FIG. 7) controls the presentation of the MOD title if such functions (i.e., stop, fast-forward, rewind, pause, etc.) are enabled. Thereafter, MOD application client 65 directs the operating system 46 in the DHCT 16 to tune the MPEG program specified in the session resource, as in step 258 (FIG. 6). The DHCT 16 then presents the user the video associated with the purchase title with additional MOD VOD stream control (i.e., stop, fast-forward, rewind, pause, etc.), as in step 259 (FIG. 6), if the additional support functions are enabled by the chosen rental option.

In one embodiment, before the rented MOD title is actually presented to the user, promotional material may be presented to the user prior to the rented MOD title. Associated with a rental option may be a set of movie trailers, each with their own asset ID. The MOD application client 65 initiates a session for each of them with the specified VOD content server 22 (FIG. 2). Typically the VOD stream control functions are disabled during trailers, as specified by the system operator in the rental option. The movie trailers are similar to movie trailers shown in movie theaters prior to the presentation of the feature presentation and are comprised of pre-edited segments of the entire movie or MOD title. Depending on the theme category of the rented MOD title, the MOD application server 19 may provide a sequence of movie trailers in the same theme as the rented MOD title. As a non-limiting example, the sequence of movie trailers may be coming attractions of MOD titles soon to be offered by the cable service provider.

In another embodiment, the DHCT 16 enables the user to reserve rental of a future MOD title presented as a trailer prior to the rented MOD title as described above. In this embodiment the reservation of future rentals would be made at a time when the MOD title to be rented in the future is not currently available. Thus, in a non-limiting example, the user, upon viewing a sequence of trailers of coming attraction MOD titles, may immediately reserve rental of one of the MOD titles shown in the trailer sequence for future viewing after the MOD title has been made available for rental. This advance rental provides the user priority for the time reserved for future viewing and insures that the system resources are available for at least fulfilling this rental request. Another non-limiting example enables the user to simply request notification of future release of a MOD title included in a sequence of trailers presented prior to the presentation of a rented MOD title. Thus, the user may receive a notification barker (not shown) instructing the user that the MOD title is now available for rental at the convenience of the user. In this non-limiting example, bandwidth is not reserved for the user at a given time, but instead, the user is prompted that a previously unavailable MOD title is now available for rental. Consequently, each reservation or request about a MOD title made by a user is communicated from the DHCT 16 to the headend 11 and stored in a memory (not shown). The future title reminders are transmitted to the MOD application server 19 by the MOD application client 65 via the UDP socket as described previously for other user customizations.

Figure 15:
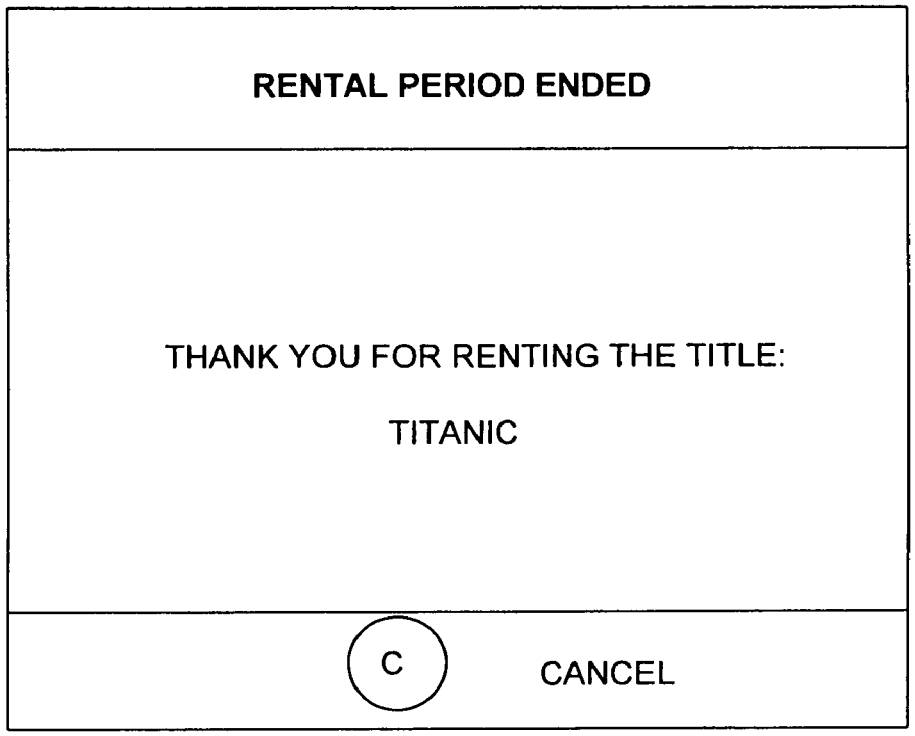
FIG. 15 is a display diagram of the rental period end screen presented to the user when the duration of the rental period has expired as chosen in the rental options screen in FIG. 11.

When the end of the MOD title is reached or the time allotted for viewing the MOD title has expired, the DHCT 16 presents the user with a message denoting that the rental period is over or that the MOD title has ended, as in step 260. FIG. 15 is a display diagram of the rental period end screen 260 presented to the user when the duration of the rental period has expired. Upon entering the cancel command through remote 40 (FIG. 7) as instructed by the rental period end screen 260, the user returns to the MOD title catalog screen 197 (FIG. 5).

Figure 16:
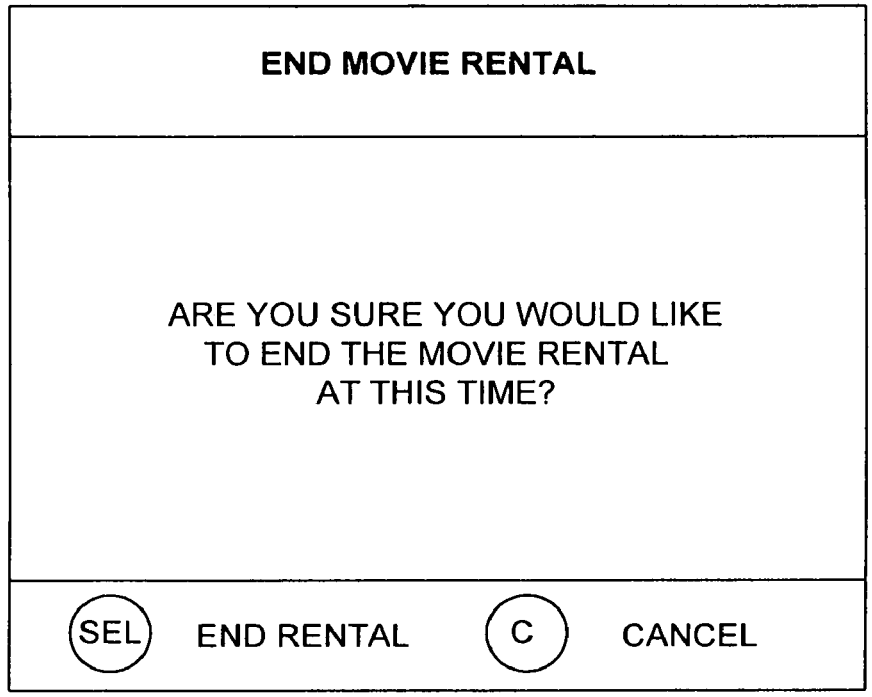
FIG. 16 is a display diagram of the end movie rental screen presented to the user when providing the opportunity to prematurely end rental of a MOD title selected from the MOD title catalog screen in FIG. 8A prior to expiration of the rental duration.

As an additional alternative, the user may prematurely end rental of the MOD title prior to expiration of the rental duration by stopping play of the MOD title and choosing an option to terminate the rental. FIG. 16 is a display diagram of the end movie rental screen 264 presented to the user when providing the opportunity to prematurely end rental of a MOD title prior to expiration of the rental duration. If the user selects the "SEL" key 189 on the remote 40 (FIG. 7) as instructed in the end movie rental screen 264, the rental of the selected MOD title is terminated and the user is returned to the MOD title catalog screen 197 (FIG. 5) where the user may opt to exit the MOD application completely. If the user selects the cancel option as provided in the end movie rental screen 264, the user is returned to the presentation of the MOD title. If the user prematurely cancels the rental of the MOD title before a pre-configured time set by a system operator at the headend through a GUI (FIG. 22), the user will not be charged for rental of the MOD title. As a non-limiting example, the user may decide after watching a purchased MOD title for three minutes to cancel the rental. If the pre-configured time to cancel without charge had not expired, the user would not pay for the MOD title rental.

Figure 17:
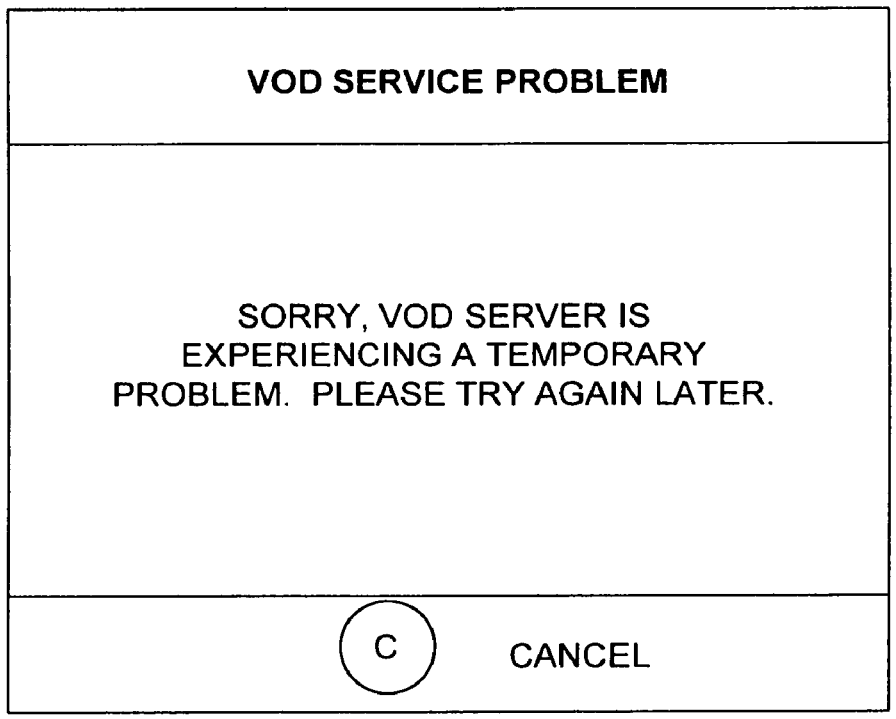
FIG. 17 is a display diagram of the MOD service problem barker presented to the user informing the user of a problem in the delivery of the purchased MOD title from the MOD title catalog screen in FIG. 8A.

The MOD application client 65 may also present the user other barkers informing the user of other conditions prior to and during rental of a MOD title depending on specific situations that may occur. If, as a non-limiting example, a problem occurs during delivery of the MOD title to the DHCT 16 that causes an interruption in the service, a message may be presented to the user instructing the user of the problem. FIG. 17 is a display diagram of the MOD service problem barker 265 presented to the user informing of the user of a problem in the delivery of the purchased MOD title. The MOD service problem barker 265 may include a cancel option enabling the user to exit the MOD application completely and implement other services while the MOD service is temporarily disabled. If upon attempt to initially access the MOD channel, the system operator has defined a conditional access descriptor regulating access to the MOD service, and the navigator application 51 on the DHCT 16 determines that the conditional access package has not been transmitted to the DHCT 16, the navigator 51 will display an unauthorized barker 267 (FIG. 18) instead of activating the MOD service.

Figure 18:
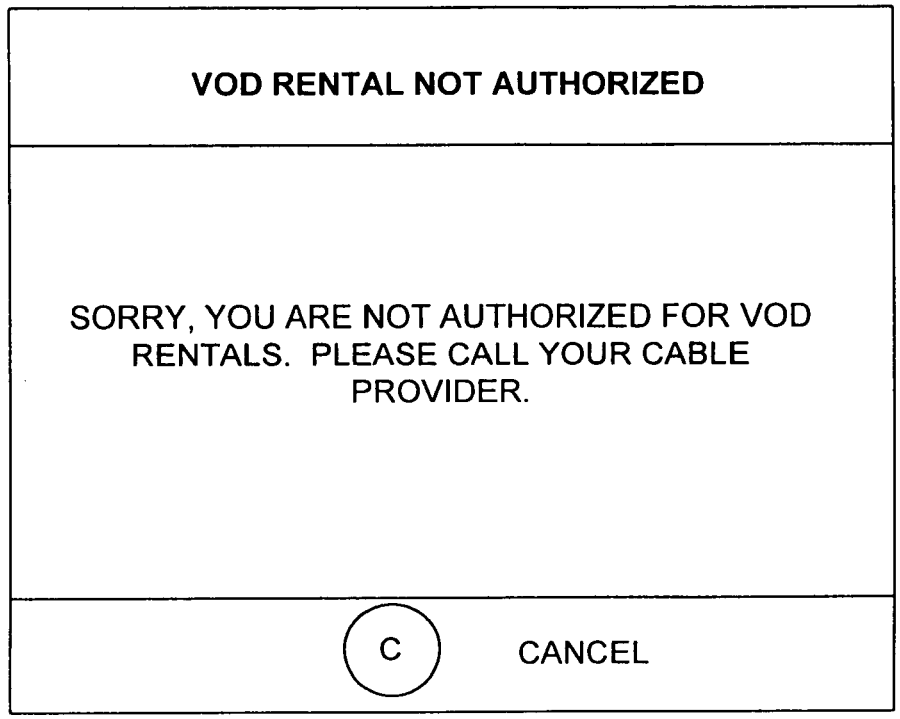
FIG. 18 is a display diagram of the MOD rental not authorized barker presented to the user if the user is not authorized to receive a MOD title selected from the MOD title catalog screen in FIG. 8A.

If during session setup the MOD application server 19 is notified of a VOD session setup for a particular title and rental option for which the user has been designated by the billing system used by the system operator as unauthorized, the MOD application server 19 will use an API of the VOD content server 22 with whom the session was created and ask that the session be torn-down because it is not authorized. When the MOD application client is notified that the session has been torn-down because the user is not authorized, the DHCT 16 may present the user a MOD rental not authorized barker 267 informing the user that the user is not authorized to receive MOD rentals and to contact the system operator. FIG. 18 is a display diagram of the MOD rental not authorized barker 267. As a series of non-limiting examples, reasons for unauthorization of MOD service access may include failure of the user to pay a prior service bill, user election to not receive MOD service, system incompatibility, or other reasons configured by the system operator at the headend 11. The VOD rental not authorized barker 267 includes a cancel option enabling the user to return to the MOD catalog.

Returning to FIG. 5, the user, upon accessing the MOD application client 65 the user may already have current rentals. The first time the MOD application is activated, it retrieves the information about the user's current rentals in the request for user information described previously. The purchase related information includes a list of title IDs for current rentals and a session ID for each if the MOD application server 19 (FIG. 2) knows that the session has not been torn down by the DNCS 23 or the VOD content server 22. Also returned are any user-configurable parameters that have been stored by the MOD application server 19 in its database in response to configuration settings made available via the MOD application client 65.

Once the MOD application client 65 determines that the user has a current rental, it checks with the DNCS 23 to see if the session for that rental is active using the session status request described previously. If the session is active upon this determination in step 193, the MOD application client 65 causes the DHCT 16 to present the user a current rental screen. If the session is not active, another MOD session may be established. In a non-limiting example, the user is enabled to rent multiple MOD titles at a given time, in which case the session for the most recently viewed title would be established. In another non-limiting example, the user may be activating the MOD application client 65 at some time subsequent to a previous rental for completion of viewing of the previously rented MOD title. In another non-limiting example, the user may be re-activating the DHCT 16 and VOD application client 65 after a power outage that interrupted presentation of the previously purchased MOD title.

Figure 19A:
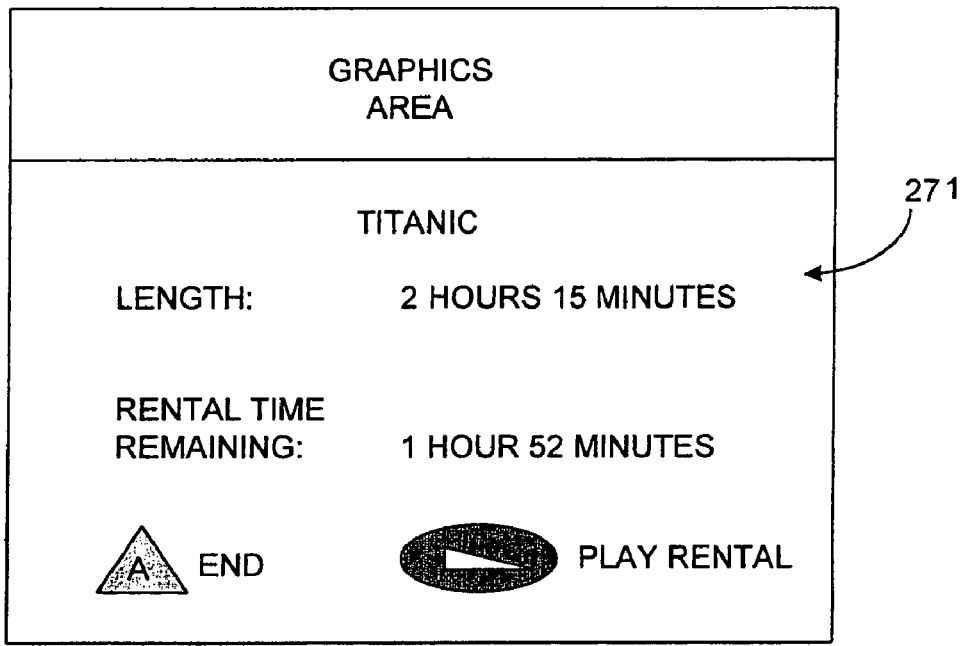
Figure 19B:
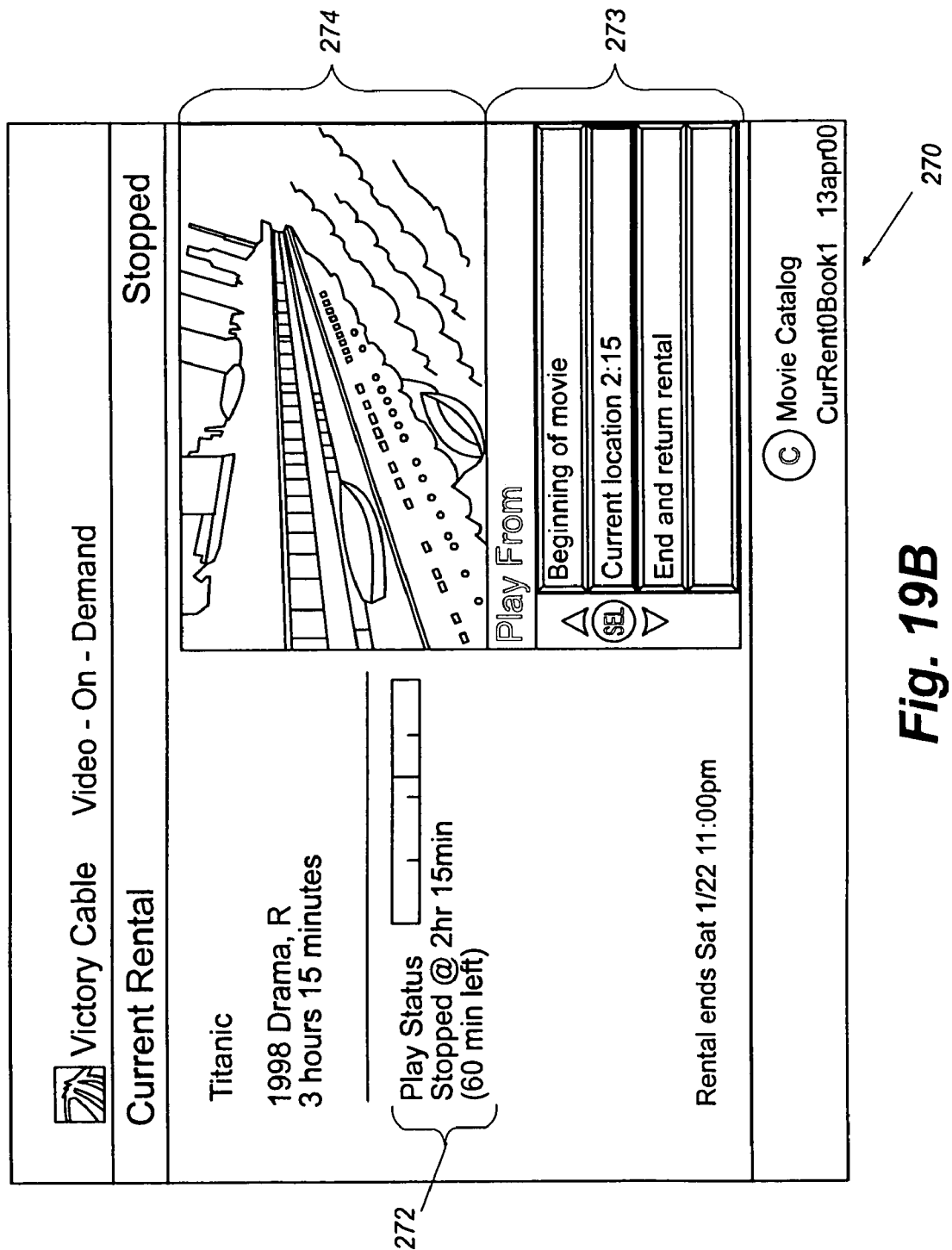

FIG. 19A is display diagram of a MOD current rental screen 270 presented to a user under the scenario described above. The current rental screen 270 merely informs the user that a MOD title has previously been rented and that its rental duration has not expired. The lower portion of the display 271 displays the MOD title currently rented, the length of the MOD title, and the rental time remaining. The lower portion of the display also provides the user the option to end the rental of the MOD title or to play the MOD title. If the user ends the rental, the DHCT 16 presents the end movie rental screen 264 shown in FIG. 16. FIGS. 19B and 19C are both diagrams of alternative embodiments of the current rental screen 270 with increased functionality.

In FIG. 19B, a play status indication 272 is provided depicting a bar graph indication of the point in the MOD title where viewing was last stopped. A "Play From" option graphic 273 is included which enables the user to select the re-commencement point of the MOD title presentation. In FIG. 19C, a "Time Remaining" indication 272' is provided which depicts bargraphs for both the playing time (previously viewed time) of the MOD title and the remaining rental period. A "Play Selector" option 273 (similar to the "Play From" option in FIG. 19B) is provided to enable the user to select a recommencement point or even to end the rental completely.

As discussed above and as shown in step 259 of FIG. 6, the MOD title may be presented to the user with VCR-like stream control functionality. VOD stream control functionality includes the ability to fast-forward, rewind, pause, stop, etc. Whether a user may utilize these MOD support mechanisms may be determined by the system operator in configuring MOD rental options as described previously, and further by the user in selecting between multiple rental options where some options include VOD stream control functionality and others do not. As a non-limiting example, a system operator at the headend 11 may configure using the MOD application server GUI whether presentation of MOD titles includes MOD support functionality through an interface (FIG. 22) at the headend 11. In both FIGS. 19B and 19C, image area 274 is provided which may be configured as a still image where the MOD title was previously stopped.

Figure 20:
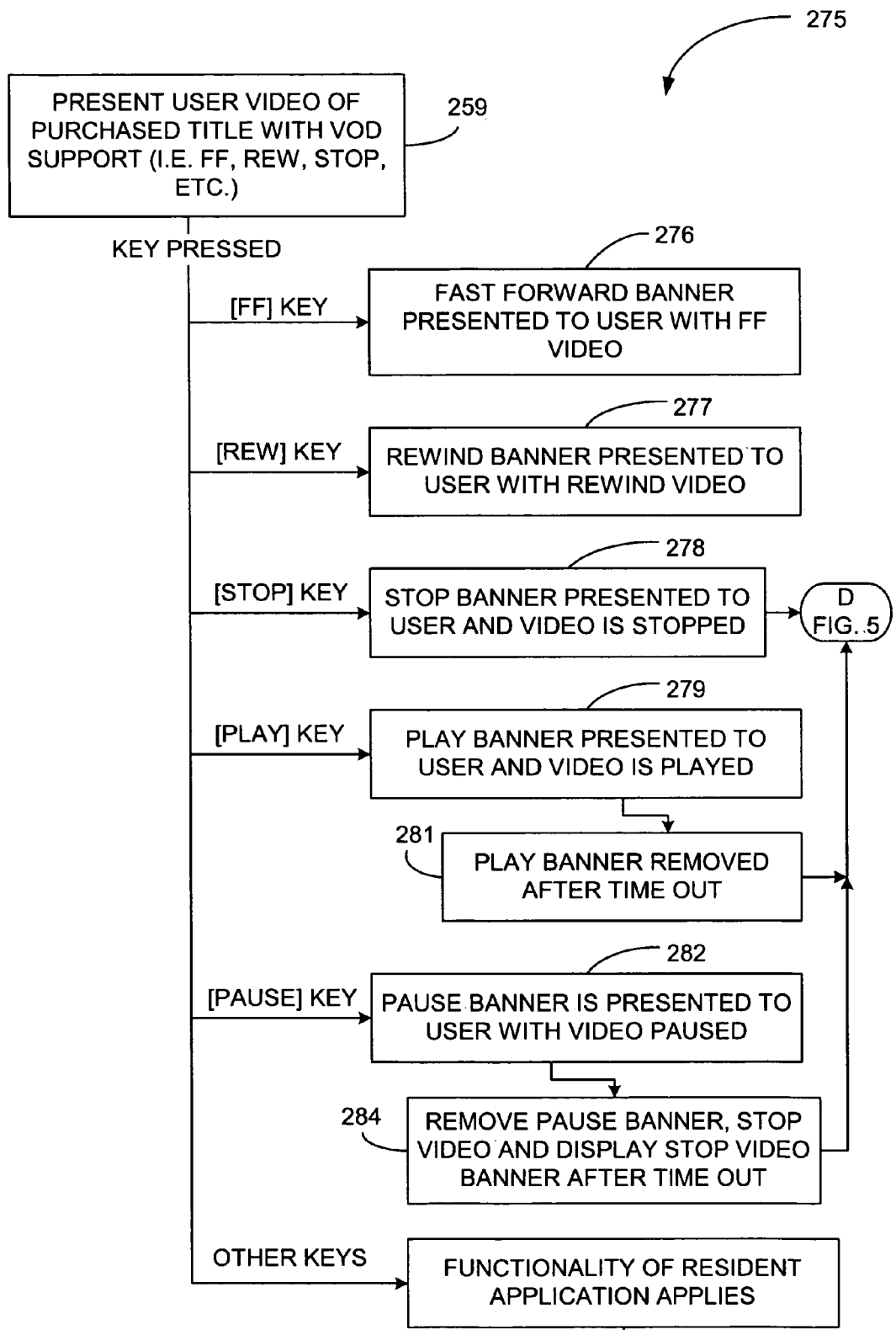
FIG. 20 is a display diagram of the VOD stream control mechanisms as described in FIG. 6 that a user may utilize during viewing of a MOD title.

FIG. 20 is a display diagram of the VOD stream control mechanisms 275 as described in FIG. 6 that a user may utilize during viewing of a MOD title. The VOD stream control mechanisms are available from step 259 from FIG. 6. If the user depresses a key on remote 40 (FIG. 7) representing fast-forward, a fast-forward banner is presented, as described in block 276 to the user on display 31, and the DHCT 16 presents a fast-forward video stream. The fast-forward video stream may or may not be a separate video stream from the real-time video stream presented in normal play mode. The MOD application client, upon receiving a fast forward request, initiates a request to the VOD content server 22 (FIG. 2) to receive the fast-forward video stream rather than the play stream or to merely expedite the play stream. This request is a UDP/IP message to the IP address and port number of the VOD content server video pump that is returned to the MOD application client as a resource in the session setup confirmation (described previously). If the user initiates a command to return to play video stream, the DHCT 16 initiates the same process with the VOD content server 22 in reverse to return to real-time play mode.

If the user enters depresses a key on remote 40 (FIG. 7) representing a rewind function, a rewind banner, as described in block 277, is presented on display 31 and the DHCT 16 presents a rewind video stream. As described with the fast-forward stream above, the rewind video stream may or may not be a separate video stream from the real-time video stream. When the user returns to playing the video stream in real-time, the rewind banner 277 is removed.

At any time in the presentation of the MOD title on the display 31, the user may stop the presentation of the video stream. Upon entry of a stop command on remote 40 (FIG. 7), the DHCT 16 presents a stop banner, as described in block 278, and the presentation of video on display is stopped by directing the VOD content server 22 to stop the stream. After the video is stopped, the DHCT 16 presents the MOD current rental screen 270 as described above and shown in FIG. 19. As described below, the MOD application client 65 may activate a screen saver after the MOD current rental screen 270 has been displayed on the display 31 for a pre-configured (FIG. 22) amount of time to prevent the image of the MOD current rental screen 270 from becoming burned into the display 31.

Depressing a key on remote 40 (FIG. 7) representing a play function causes the DHCT 16 to display a "play" banner on the display 31, as described in block 279. Upon presenting the play banner, the video is played at real-time speed as discussed above and the play banner is removed after a few seconds thereafter, as depicted in block 281.

If the user desires to pause the playing of the MOD title, a command on remote 40 (FIG. 7) may be initiated by depressing a key representing "pause." When the MOD application client 65 on the DHCT 16 receives the command to pause the presentation of the MOD title on display 31, the pause banner is presented, as depicted in step 282, the pause command is sent to the VOD content server 22, and a freeze-frame image of the video where it was stopped in the video stream is presented on the display 31. After the video stream has been paused for a pre-configured amount of time, block 284 depicts that the pause banner 282 is removed and the video is stopped. A stop banner is presented similarly as described above in reference to block 278. The MOD application client 65 may activate a screen saver after the MOD current rental screen 270 has been displayed on the display 31 for a pre-configured amount of time to prevent the image of the MOD current rental screen 270 from becoming burned into the display 31. The screen saver function is described in more detail below.

Other inputs on the remote 40 (FIG. 7) or other input device may also represent functionality that is applicable to the presentation of a MOD title, as shown in block 285. Upon entry of one of these other keyed inputs, a banner may appear on display 31 indicating the appropriate action corresponding to the input. As a non-limiting example, pressing the "INFO" button on the remote 40 (FIG. 7) directs the MOD application client 65 to display a graphic showing the elapsed time in the movie and the rental time remaining.

Figure 21:
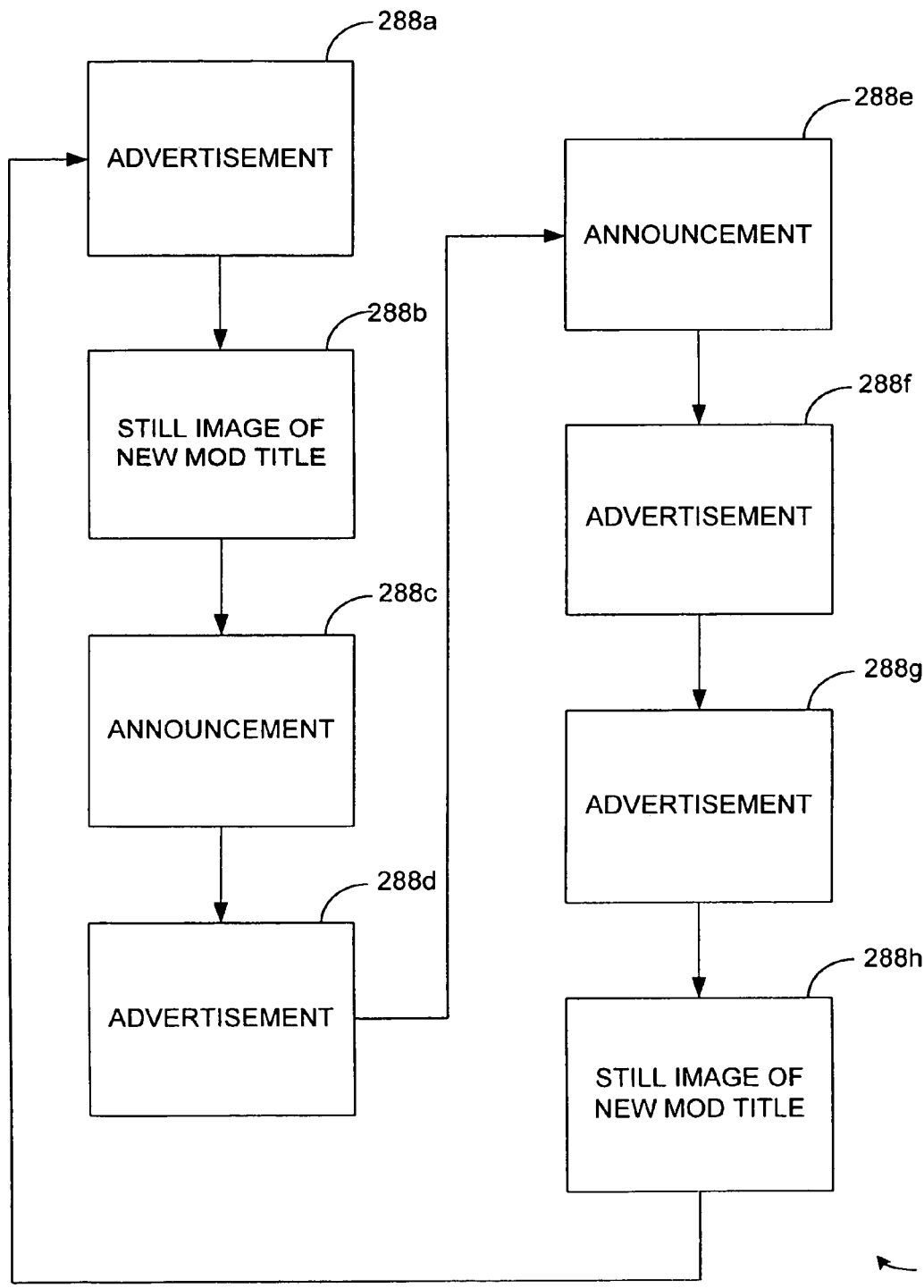
FIG. 21 is a diagram of a non-limiting example of a sequence of still screens that may comprise a screen saver operation that operates as described in FIG. 20.

If a still image is maintained on the display 31 for a pre-configured amount of time, the MOD application server 65 may invoke a screen saver function to protect the display 31 from a burn in effect that can occur if an image remains on a display too long. The still screen, as a non-limiting example, may be the current rental screen 227 (FIG. 10) as described above in regard to the stop and pause functions, or the still screen may be any other image that does not change with time. The system operator at the headend 11 may configure the MOD application to include a screen saver that may be activated after a set time has expired. The screen saver may comprise a sequence of still screens that may be advertisements, announcements or other information capable of display on a still screen. The sequence of still screens may be displayed in a rotation that enables each screen to be displayed for some configurable time period before the next still screen is displayed. FIG. 21 is a diagram of a non-limiting example of a sequence of still screens 287 that may comprise a screen saver operation. In this non-limiting example, a series of still screens 288a–288h rotate in succession.

In another embodiment, the screen saver is presented as a video stream that, as a non-limiting example, is a set of movie trailers of movies currently available for rental in the MOD title catalog screen 197 (FIG. 8B). In this non-limiting example, the DHCT 16 tunes the MPEG stream containing the trailers, with the frequency and program number being passed to the MOD application client 65 in the service parameter data. Thus, in this non-limiting example, if the user has stopped the presentation of the MOD title and walked away, the DHCT 16, after a pre-configured amount of time, tunes the display 31 to a channel of movie trailers. The movie trailers, as described above, are pre-edited segments of MOD titles (movies, etc.) that are, for example, new releases or coming attractions and are continuously presented until the user presses a key on remote 40 (FIG. 7). Upon hitting any remote 40 key, the user is returned to the previous point where the user left off in the MOD application—the MOD current rental screen (which appears when the user stops the presentation of a MOD title).

In yet another embodiment, the screen saver may be configured by the system operator, through an interface on the MOD application server at the headend 11, to be some type of moving image. As a non-limiting example, the system operator may configure the MOD application to display a logo of the cable service provider to the user as the screen saver.

Because of the possible limited resources available for MOD title presentation (i.e., bandwidth, number of streams supported by VOD content server 21 (FIG. 2), number of streams per title, number of VOD content servers 21, etc.), the user is typically offered a limited amount of time to view the rented title. This period is described above in regard to the rental options screen 227 (FIG. 10). Rented duration time is typically be longer than the length of the MOD title to allow the user to use the VOD stream control mechanisms described above, but that may not always be the case. As a non-limiting example, the user, via a chosen rental option, may purchase a MOD title to be displayed in its entirety without any interruption generation by the user similar to a conventional movie theater. However, it is more common that the rental period is longer that the MOD title length to enable access to the VOD stream control mechanisms. Different play options enable the user to implement the VOD stream control mechanisms while still having the opportunity to view the MOD title in its entirety.

In one embodiment, the user is informed by a display barker (not shown) at the beginning of the presentation session of the purchased MOD title of the time to finish the viewing of the MOD title. However, the user has full and free control of the VOD stream control mechanisms, as described above and in FIG. 20 throughout the rental duration. It is the responsibility of the user to view the program before the expiration of the rental duration. Thus, if the user rewinds the video stream to a point where the new time remaining to play the remaining video stream is greater than the remaining rental duration and plays from that point, the user will not be able to view the entire MOD title. Similarly if the user stops the presentation of the MOD title and commences playing the MOD title such that the remaining presentation time is greater than the remaining rental duration, the user will not be able to view the entire MOD title. No other message is presented to the user other than the initial display barker and the rental period end screen 260 (FIG. 15) once the rental duration is complete.

Another embodiment is that the user is afforded full and free control of the VOD stream control mechanisms as described above and as shown in FIG. 20 throughout the rental duration. If the time remaining in the rental duration becomes equal to the remaining length of the MOD title, a warning barker (not shown) is presented to the user informing the user that the time remaining in the rental duration is insufficient to view the remaining MOD title to completion. After the user has been alerted by the warning barker, the user may still activate the VOD stream control mechanisms, but the entire MOD title cannot be viewed in its entirety. An alternative embodiment to this embodiment affords the user an opportunity to purchase additional rental time for viewing the remaining MOD title. A extra time purchase barker (not shown) may be presented to the user as part of the warning barker enabling the user to purchase sufficient additional time to complete viewing the MOD title.

Still another embodiment allows the user to utilize the VOD stream control mechanisms during a MOD period that is the calculated difference between the remaining rental duration and the remaining presentation length. While the MOD period is not equal to zero, the user is enabled to utilize all VOD stream control mechanisms as described above; however, when the MOD period does expire (become zero), the user is no longer enabled to use certain VOD stream control mechanisms unless the MOD period again becomes greater than zero. As a non-limiting example, if the MOD period expires, the rewind, stop and pause functions would no longer operate because otherwise the user would not be able to view the MOD title in its entirety because the remaining rental duration is insufficient. The user could still use the fast-forward function since this would operate to make the remaining rental duration greater than the remaining title length (i.e., a MOD period greater than zero). Thus, once the user fast-forwards the MOD title thereby making the MOD period greater than zero, the previously inoperative VOD stream control mechanisms (i.e., stop, rewind, and pause) would operate again.

If the user tunes to a channel other than the MOD channel that is presenting the purchased MOD title, or if the user powers off the DHCT 16, the stop mode is automatically entered. In one non-limiting example, if the MOD period does not expire before the returns to the MOD channel of the MOD title, presentation of the MOD tide resumes where it was stopped. In another non-limiting example, if the MOD period does expire before the user returns to the MOD channel presenting the MOD title, the MOD title resumes streaming to the DHCT 16 even though the DHCT 16 is tuned to another channel and the user is alerted by a resume barker (not shown) of the MOD title presentation resumption. If, in another non-limiting example, the user returns after expiration of the MOD period, the presentation of the MOD title is resumed at the point in the MOD title such that the MOD title ends at the end of the rental duration thereby causing a middle portion of the MOD title to be unviewed by the user. Regardless of the different embodiments involving the MOD period, if the user returns to the MOD channel after the rental duration has expired, the MOD title catalog screen 197 (FIG. 8B) is displayed and no portion of the MOD title is viewed.

Calculation of the MOD period, remaining title length, and rental period remaining are determined as follows. The MOD application client 65 stores in memory on the DHCT 16 the time at which the MOD title is purchased. It also stores the rental option, which includes the rental duration. Thus, at any time the MOD application client 65 can calculate the time remaining in the rental period.

The VOD content server 22 provides an API for the MOD application client 65 to request the normal play time (NPT) value of a video stream being played. Based on this information and the duration of the title (stored in the catalog), the MOD application client 65 can calculate at any given time the remaining title length. Alternatively, the MOD application client 65 can calculate the NPT based on the time of the last stream control operation and the rate at which the VOD content server is playing the stream.

The MOD application client 65 can then calculate at regular intervals such as once per minute the VOD period equal to the rental time remaining minus the remaining title length. During the rewind stream control operation, this calculation is done more frequently based on the rate of rewind that was specified to the VOD content server 22. In this case the MOD application client 65 can calculate the NPT based on NPT at initiation of rewind, rate of rewind, and duration of the rewind operation. This allows the MOD application client 65 to recomputed the VOD period at a constant interval of for example 60 NPT seconds. As a non-limiting example, if the rewind rate is 30 times the normal play rate the VOD period would be recalculated every 2 seconds (60 seconds divided by 30) to be effectively reevaluating the VOD period every 60 seconds of movie being streamed out of the VOD content server.

Alternatively, the MOD application client 65 can pre-compute the point in the stream during rewind that will cause the VOD period to drop below zero and request that the VOD content server 22 stop rewinding the stream at that point.

The system operator may configure, using the MOD application server GUI, parameters that determine when a session ends if the user interrupts the presentation of a MOD title. In one embodiment, the system operator may, via an interface (not shown), configure a session to be maintained for the entire rental duration even during the portion of the rental period when the user is not viewing the MOD title. This non-limiting example maintains the bandwidth for the user regardless of other system constraints or requests. In another embodiment, the system operator, through the interface at the headend 11, may configure the session providing the MOD title to be torn down after a pre-configured time. The pre-configured time may be based upon certain user input or some user inactivity. As a non-limiting example, if the user stops the presentation of a MOD title and the pre-configured time of inactivity expires, the session established to deliver the MOD title to the DHCT 16 of the user may be torn down as described above. When the user returns to the MOD channel the MOD application client 65 determines that there is a current rental but that no session exists. It then follows the steps described previously to set up a session with the VOD content server 22. If this session fails and the rental period is still active, the MOD application client 65 retries the session setup at different intervals based on the reason for the session setup failure. Additionally, a problem barker is displayed informing the user that the MOD service cannot be re-established and that the MOD application is retrying.

If DHCT 16 power is lost during MOD title viewing one of two scenarios may occur. First, for a power glitch whereby the DHCT 16 immediately reboots and the user subsequently tunes to the MOD channel, the session for the MOD title will still be playing. Thus, the MOD application client will discover from the MOD application server that the user has a current rental and will then verify with the VOD content server that the session is active. Hence, when the MPEG frequency and program information is retrieved from the DNCS 23 session and resource manager for that session, the stream will have been playing during the elapsed power outage time and the user will rewind the movie to view the portion they missed.

For a longer term power outage, the session and resource manager in the DNCS 23 will determine that the DHCT 16 is no longer responding to the session status request as described previously. The session will be torn down and the MOD application server 19 will be notified of the session tear-down and record the fact that there is no session for that user and title in the database. Then, when the DHCT 16 is powered-up and the MOD service activated, the MOD application client 65 will be told that no session currently exists for the current rental.

A system operator interface may enable the system operator to configure presentation of promotional information such as movie trailers or previews upon user requests for information about a MOD title. As described above in regard to FIG. 8A, the system operator may configure the MOD title catalog display to present an option for the user to view a preview or trailer of the MOD title if the user requests "INFO" about a particular MOD tide. The preview or trailer may be configured, through the interface, to appear in a reduced portion of the MOD title catalog screen or in a full screen format.

Additionally a system operator interface (not shown) for promotional information may enable a system operator to configure different areas of various screens, as described above, for example, the MOD title catalog screen 197. In one embodiment, the system operator can configure brand graphics to appear on the display screens mentioned above. Brand graphics may include graphics identifying the cable service provider. As a non-limiting example, a brand graphic 298 in FIG. 19C identifies the cable service provider as "Victory Cable." In this non-limiting example, the brand graphic includes an image logo with the identifying information "Victory Cable." Thus, the system operator, through an interface, can cause the brand graphic 298 to be shown on any MOD display screen wherein the brand graphic is a separate image file typically stored on BFS server 28 that is accessed whenever a user activates the MOD application.

In similar fashion, the system operator may include advertising graphics (not shown) that are files placed on the BFS server 28 by the MOD application server 19, and are similarly accessed when a user activates the MOD application. Advertising graphics, as known in the art, refer to promotional information about an entity other than the cable television provider. Thus, in a non-limiting example, the advertising graphics may be graphics for merchants who purchased advertising through a particular cable television provider to have the merchants advertising graphics displayed whenever the user accessed the MOD application. In this example, the merchant could be a popcorn provider, and the graphic that appears in the MOD display screens (i.e. the MOD title catalog screen) could be an image of popped popcorn with descriptive text.

In an alternative embodiment, the advertising graphics that appear in the MOD screens may be provided by an external operator located at another physical location apart from headend 11. The system operator, in this embodiment, configures the MOD application, through the interface, to implement advertising graphics in the MOD display screens broadcast to the DHCTs 16 from the BFS 28 that are stored externally to the cable television system 10. As a non-limiting example, advertising graphics stored externally to the cable television system may be accessed by a universal resource locator (URL), for example, across the Internet for implementation in the MOD display screens. Thus, each time the MOD application client 65 attempts to retrieve an advertisement according to a pre-configured URL, a different advertisement graphic may be obtained from the external provider of the graphic so the user always sees different advertisements. In this embodiment, APIs (application programming interfaces) are provided to the external advertising graphic providers to enable compatibility with the MOD display screen configurations. Moreover, this embodiment enables advertisements to be quickly updated and tailored to the interests of an individual user or group of users.

A user may access the MOD application client 65, as described above, from a "trailer channel" if the user desires to purchase the MOD title corresponding to a particular trailer on the display. This configuration of the MOD service is indicated to the MOD application client 65 in the service parameter. Upon being activated in this mode, the MOD application client 65 uses facilities of the operating system 46 to tune to the specified QAM frequency and MPEG program to display the trailers. The title ID about which trailer is currently playing is carried in an MPEG private data PID synchronous with the MPEG video and audio. The MOD application client 65, upon a user input initiated during a particular trailer presentation, would set the display 31 to the MOD title catalog screen 197 with the MOD title corresponding to the particular trailer highlighted. The user could then purchase that particular MOD title in a manner as described above.

As an alternative embodiment, the trailer channel may actually be a plurality of trailer-type channels configured according to style, genre, theme, etc. As a non-limiting embodiment, the MOD application server 19 may be configured to support a comedy trailer channel wherein all trailers advertise MOD titles that are comedies, a drama trailer channel for dramatic MOD titles, etc. Just as above, the user, upon viewing a trailer in any one of these trailer channels may, upon input by remote 40 (FIG. 7) go to the MOD title catalog screen with the MOD title corresponding to the trailer highlighted for purchase.

FIG. 22 is a non-limiting example of a system operator GUI 295 for configuring some of the previously described configurable parameters. In this non-limiting example, the GUI 295 enables the system operator to configure the duration between pause and stop modes. Additionally, the system operator may configure the time duration for tearing down a session after user inactivity, as described above. A time parameter, in this non-limiting example, may be set to notify the user prior to tearing down a session. The system operator may configure a time parameter wherein the user may cancel a rental of a MOD title. The length of preview of a MOD title may also be configured by setting a time parameter. Finally, in this non-limiting example, the system operator may determine which title category is initially shown to the user. Alternatively, a system operator may, through a GUI as described above, define bandwidth limitations for individual DHCTs 16 to limit the bandwidth assigned to any one DHCT 16 and thereby the number of MOD title rentals at a time.

The present invention describes the MOD application server 19 and client 65 as a system that delivers media to the user of the DHCT 16 where the media described is typically movies; however, it is not the intent to limit the present invention merely to a system that delivers video (i.e. movies) only. It should be clear that the MOD application may be implemented to deliver any type of visual and aural media to the user of the DHCT 16. As a non-limiting example, the headend 11 (FIG. 1) and DHCT 16 (FIG. 3) may be implemented by the MOD application to provide music-on-demand, stock quotes on-demand, television programs on-demand etc. The MOD application server 19, in this alternative embodiment, is a media on demand server that manages all media-type requests as demanded and coordinates the appropriate components in the headend 11 to provide the service on-demand. Thus, the VOD content manager 21 would operate to provide the video-on-demand service, and other media-type content managers may be employed (i.e., Stock quotes-on-demand content manager, etc.) would provide that media type on-demand. Thus video-on-demand is but one type of media that is deliverable on-demand in the manner consistent with the present invention.

The MOD application, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

The flow charts described above and shown in the figures of the present invention show the architecture, functionality, and operation of a possible implementation of the present invention. In this regard, each block represents a module, segment, or portion of code, which comprises one or more executable instructions for implementing the specified logical function(s). It should also be noted that in some alternative implementations, the functions noted in the blocks may occur out of the order.

It should be emphasized that the above-described embodiments of the present invention, particularly, any "preferred embodiments" are merely possible examples of the implementations, merely setting forth for a clear understanding of the principles of the inventions. Any variations and modifications may be made to the above-described embodiments of the invention without departing substantially from the spirit of the principles of the invention. All such modifications and variations are intended to be included herein within the scope of the disclosure and present invention and protected by the following claims.

We claim:

1. A method for an interactive media services system to provide media to a user through an interactive media services client device, said client device coupled to a programmable media services server device, said method comprising steps of:

implementing an interactive media guide;

implementing said client device to present said interactive media guide to said user;

providing a system operator with an interface to said programmable media services server; and providing control options within said interface to allow said system operator to set a plurality of parameters concerning bandwidth usage;

terminating a media session through said interactive media services system if one of a plurality of client device and system variables comprises a timeout, said timeout occurring when said media session has been in a stop state for a period equal to a stop timeout parameter configured as one of said plurality of parameters concerning bandwidth usage; and forcing said client device to present a main screen of said interactive media guide after said media session is fully terminated, allowing bandwidth to be allocated elsewhere.

2. The method of claim 1, wherein said terminating step involves said interactive media services system keeping said media session active until the end of a rental duration period assigned to said media session independent of the behavior of any of a plurality of client device and system variables.

3. The method of claim 1, wherein another one of said plurality of client device and system variables comprises another timeout, said other timeout occurring when said media session has been in a pause state for a period equal to a pause timeout parameter configured as one of said plurality of parameters concerning bandwidth usage.

4. The method of claim 3, wherein said period is equal to said pause timeout parameter, client device is forced to present a stop state and said media session is halted.

5. A method for an interactive media services system to provide media to a user through an interactive media services client device, said client device coupled to a programmable media services server device, said method comprising steps of:

implementing an interactive media guide;

implementing said client device to present said interactive media guide to said user;

providing a system operator with an interface to said programmable media services server;

providing control options within said interface to allow said system operator to set a plurality of parameters concerning bandwidth usage; and comparing a cancellation period to one of said plurality of parameters concerning bandwidth usage regarding a no charge cancellation period, if a cancellation period is less than said no charge cancellation period a purchase fee assigned to said user for a media session is erased from billing record.

6. The method of claim 5, wherein said interactive media services system keeps said media session active until the end of a rental duration period assigned to said media session independent of the behavior of any of a plurality of client device and system variables.

* * * * *

UNITED STATES PATENT AND TRADEMARK OFFICE
CERTIFICATE OF CORRECTION

PATENT NO. : 7,010,801 B1
APPLICATION NO. : 09/590520
DATED : March 7, 2006
INVENTOR(S) : Dean F. Jerding et al.

Page 1 of 1

It is certified that error appears in the above-identified patent and that said Letters Patent is hereby corrected as shown below:

In the SPECIFICATION:

Column 13, line 32 change "tide" to --title--

Column 13, line 33 change "tide" to --title--

Column 13, line 37 change "tides" to --titles--

Column 13, line 38 change "tide" to --title--

Column 13, line 48 change "tide" to --title--

Column 15, line 4 change "tides" to --titles--

Column 20, line 18 change "tide" to --title--

Column 28, line 63 change "tide" to --title--

Column 30, line 41 change "tide" to --title--

Signed and Sealed this

Fifteenth Day of April, 2008

JON W. DUDAS
*Director of the United States Patent and Trademark Office*